(12) United States Patent
Yoshizawa

(10) Patent No.: US 7,889,393 B2
(45) Date of Patent: Feb. 15, 2011

(54) DOCUMENT READING APPARATUS AND AN IMAGE FORMATION APPARATUS THEREWITH

(75) Inventor: Fumio Yoshizawa, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 1156 days.

(21) Appl. No.: 11/041,722

(22) Filed: Jan. 25, 2005

(65) Prior Publication Data

US 2005/0185224 A1 Aug. 25, 2005

(30) Foreign Application Priority Data

Jan. 26, 2004 (JP) ............................. 2004-016574

(51) Int. Cl.
*H04N 1/409* (2006.01)

(52) U.S. Cl. ...................... 358/3.01; 358/1.9; 358/3.26; 358/474; 382/190; 382/193; 382/194; 382/195

(58) Field of Classification Search ............... 358/3.01, 358/474, 1.9, 440, 1.15, 3.26; 382/163, 170, 382/299, 176, 178, 132, 239, 190, 193, 194, 382/195; 250/559.45
See application file for complete search history.

(56) References Cited

U.S. PATENT DOCUMENTS

| | | | | |
|---|---|---|---|---|
| 5,231,574 A | * | 7/1993 | Agano | 382/132 |
| 5,940,189 A | * | 8/1999 | Matsubara et al. | 358/440 |
| 5,991,439 A | * | 11/1999 | Tanaka et al. | 382/178 |
| 6,104,832 A | * | 8/2000 | Saito et al. | 382/176 |
| 6,878,956 B2 | * | 4/2005 | Yamada | 250/559.45 |
| 7,545,529 B2 | * | 6/2009 | Borrey et al. | 358/1.15 |
| 2003/0133608 A1 | * | 7/2003 | Bernstein et al. | 382/163 |
| 2003/0206308 A1 | * | 11/2003 | Matsuya | 358/1.9 |
| 2005/0180645 A1 | * | 8/2005 | Hasegawa et al. | 382/239 |
| 2006/0066921 A1 | * | 3/2006 | Saka et al. | 358/474 |

FOREIGN PATENT DOCUMENTS

| | | |
|---|---|---|
| EP | 1 014 691 A2 | 6/2000 |
| EP | 1 307 039 A2 | 5/2003 |
| EP | 1307039 A2 * | 5/2003 |
| EP | 1 330 116 A2 | 7/2003 |
| JP | 4-109754 | 4/1992 |
| JP | 10-233875 | 9/1998 |
| JP | 2001-144901 | 5/2001 |
| JP | 2001-157046 | 6/2001 |
| JP | 2003-169214 | 6/2003 |
| JP | 2003-198838 | 7/2003 |
| JP | 2003-228203 | 8/2003 |
| JP | 2004-258939 | 9/2004 |

* cited by examiner

*Primary Examiner*—Edward L Coles
*Assistant Examiner*—Ashish K Thomas
(74) *Attorney, Agent, or Firm*—Oblon, Spivak, McClelland, Maier & Neustadt, L.L.P.

(57) ABSTRACT

A document reading apparatus and an image formation apparatus are disclosed. The document reading apparatus detects a locally patent image pixel in a main scanning direction, determines whether locally patent image pixels continuously appear at the same pixel position in the main scanning direction, and counts the number of lines on which locally patent image pixels continuously appear at the same position in the main scanning direction. When the number exceeds a predetermined value, pixel values of locally patent image pixels detected afterwards at the same position in the main scanning direction are removed. If a locally patent image is not detected, the counted number of lines is initialized.

6 Claims, 16 Drawing Sheets

PIXEL VALUE(LEVEL EXPRESSED BY IMAGE DATA)

MAIN SCANNING DIRECTION X →

MATCHING PATTERN

DISTRIBUTION OF IMAGE DATA IN EFFECTIVE LENGTH

DOCUMENT READING APPARATUS AND AN IMAGE FORMATION APPARATUS THEREWITH

BACKGROUND OF the INVENTION

1. Field of the Invention

The present invention relates to a document reading apparatus including an optical system configured to project an image of a document to an image pickup device, and an image formation apparatus including a document scanner configured to drive one of the optical system and the document in relation to the other in a sub-scanning direction, and an image data processor configured to compensate for distortion of read image data.

2. Description of the Related Art

As for apparatuses such as a copier, a facsimile apparatus, and a scanner that read an image using an optical line sensor, there are two types. Namely, in a flat bed method, a document is placed on a reading glass (contact glass), and an image of the document is read by either driving a luminous source and a mirror for projecting the image to a fixed line sensor, or by moving the light source and the line sensor at a fixed speed; and in a sheet feed method, the image is read by moving the document while the light source and the line sensor are fixed.

If a reading operation (henceforth called scanning) of a document is performed with dust adhering to the reading glass, the image of dust is read as a point of the same magnitude as the dust in the case of the flat bed method. Consequently, a point-like foreign substance appears at the position of the dust on the read document image. In the case of the sheet feed method, the image of the dust on the reading window on which the document passes is read as a noise line having a width equal to the size of the dust. Consequently, in the read document image, a foreign substance image (noise line) appears dividing the document image. An example of the foreign substance image (noise line) is shown in FIG. 16.

If the size of the dust is very small such as dust drifting in the air, the point-like foreign substance image will hardly degrade the quality of the image. However, a straight line-like foreign substance image, i.e., a noise line, degrades the appearance of the image regardless of the size of the dust, since the noise line is present for the full length of the image. Even if the flat bed method is employed, wherein the luminous source and the mirror move in the sub-scanning direction for projecting a document image to the fixed line sensor, if the mirror that reflects the light of the document to the image pickup device is dirty, a noise line will appear.

If the cause of the foreign substance image is dust, the problem can be solved by cleaning the reading window when a noise line is found on the read document image. However, in the case of facsimile transmission, and the like, transmission is often carried out to a partner without the user checking an image, and without noticing a noise line. Further, when a great number of documents are copied, and when a great number of copies of a document are carried out using a copier, cleaning after noticing the noise line can be time and effort consuming. In order to cope with this problem, image readers that are capable of reducing a noise line to an inconspicuous level are available, wherein image data processing is performed. Conventional technologies are described.

[Patent Reference 1]

JPA 10-233875 proposes a noise line detection method that determines presence of a black stripe, and displays that there is an unusual image. According to the method, a scanner reading image is rotated 90 degrees (i.e., the main scanning direction and the sub-scanning direction are exchanged), and the rotated image is stored in a memory. Then, continuation of black pixels in the main scanning direction is detected, and it is determined whether the continuation exceeds a predetermined value. If the determination is affirmative, it is determined that there is a black stripe, and a notice to the effect is displayed.

[Patent Reference 2]

JPA 2001-144901 discloses a noise line detection method, wherein a conveyance belt is read without conveying a document, whether there is a black stripe in the read image is determined, and an alarm signaling that the reading glass is dirty is displayed if the determination is affirmative.

[Patent Reference 3]

JPA 2003-169214 discloses an image formation apparatus, wherein multi-value image data of a document are converted into binary data, the binary data are compared with a matching pattern beforehand stored to a ROM such that a black stripe is detected by pattern matching, and the black stripe is removed.

[Patent Reference 4]

JPA 2003-198838 presents an image processing method of detecting a belt-like image as a noise area, the belt-like image beginning with the starting edge of document reading and ending with the ending edge of the document, and rectifying the image data of the noise area based on pixel values of adjacent pixels.

As described above, the conventional technologies detect a noise line by determining whether unevenness in gradation data in the main scanning direction matches a noise line, based on the gradation data of a read image or binary data thereof. However, so long that the presence of a noise line is determined by the unevenness in the gradation data, there is always a risk of mistaking a line originally written on the document for a noise line. If such a mistake occurs, a part of the document is not reproduced, the part being erroneously determined to be noise, and readability of the reproduced image is degraded.

However, if an attempt is made such that a document image and a noise line are faithfully distinguished, processing steps and the configuration of an image reading apparatus become complicated. For example, although it is possible to store image data of a page in a frame of memory, to read the data from the frame of memory, to determine the presence of a noise line, and to compensate for image data of the pixels of the noise line without spoiling original data of adjacent pixels, a great memory capacity for storing the one page of image data is needed. Especially, when the image is read in multi-gradation (for example, 8 bits), a great amount of memory is needed, and further, the processing time becomes remarkably long. From the background as described above, a method of detecting a noise line on an image expressed by multi-value image data in a short time from the start of document reading using a small buffer memory is required.

SUMMARY OF the INVENTION

A primary object of the present invention is to provide a document reading apparatus that is capable of detecting a noise line in an image expressed by multi-value image data in a short time from the start of document reading, and capable of performing removal compensation, and an image formation apparatus therewith, the document reading apparatus and the image formation apparatus substantially obviating one or more of the problems caused by the limitations and disadvantages of the related art.

A secondary object of the present invention is to achieve the above object with a reduced amount of image memory to be used when detecting the noise line.

Third, the present invention aims at reducing the risk of erasing image content originally drawn on the document.

Features and advantages of the present invention are set forth in the description that follows, and in part will become apparent from the description and the accompanying drawings, or may be learned by practice of the invention according to the teachings provided in the description. The objects as well as other features and advantages of the present invention will be realized and attained by the document reading apparatus and the image formation apparatus therewith particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides the document reading apparatus and the image formation apparatus therewith as follows.

(1) An aspect of the present invention provides a document reading apparatus that includes a document scanning unit (10) consisting of an image pickup device (207) constituted by a photo-electric-conversion element array having a great number of photo-electric-conversion elements that are arranged in an array in the main scanning direction, the document reading apparatus repeatedly outputting an image signal read by the array in the main scanning line direction, a converting unit configured to convert the image signal into multi-value image data corresponding to pixels on the main scanning line, an optical system constituted by optical system (232 through 236) configured to project a document image to the image pickup device, and a sub-scanning unit (30/238) configured to drive one of the optical system and the document in relation to the other in the sub-scanning direction; and an image data processing unit (IPP) configured to determine (s3 through s7) whether each pixel on the main scanning line is a locally patent image pixel, which is a pixel having a locally high patent image level, in the main scanning direction based on the multi-value image data, to count (s8) the number of lines (R6) that have a locally patent image pixel at the same pixel position on the main scanning line as lines to scan-advance by sub-scanning, and to rectify image data of a locally patent image pixel at the same pixel position, if the number of lines (R6) exceeds a reference value (L) such that the image data of the locally patent image pixel are equalized afterwards.

EFFECT OF THE INVENTION

According to the document reading apparatus, when a noise line appears, the number of the lines (R6), where locally patent image pixels continuously appear at the same pixel position in the main scanning direction, first exceeds the reference value (L) when sub-scanning reaches and exceeds the reference value (L) after the start of document reading. Accordingly, multi-value image data of the locally patent image pixels are replaced, i.e., rectified by equalized data only as for the noise line after the time of sub-scanning advancing to the reference value (L) and down to the sub-scanning ending point of the document. Here, the equalized data are data that provide evenness, i.e., making the locally patent image pixel inconspicuous. As described above, the noise line is detected and removed in a short time from the start of document reading. Further, a small amount of image storage is required by noise line detection processing, dispensing with the need for writing of multi-value image data of the whole document to the storage.

In general, a noise line appears as a straight line from the starting edge to the ending edge of a document in the sub-scanning direction. On the other hand, an original image on the document usually starts and finishes with certain amounts of margins from the edges. Accordingly, a straight line that runs from the starting edge of a document, through a margin, and runs in the sub-scanning direction has a high probability of being a noise line. In the margin, text information such as a page number, a header, a footer, and management information of facsimile transmission/reception may be present, which should not be mistaken for a noise line. Characters used in text information are usually below 12 points, and specifically, character size measured in the sub-scanning direction, i.e., the height of the characters is 4 mm or less. Therefore, the probability of mistaking a character for a noise line can be made low by setting the reference value (L) at a value greater than 4 mm. In this manner, the risk of mistaking an original image for a noise line is lowered.

(1a) Another aspect of the present invention provides the document reading apparatus as described above (1) wherein the image data processing unit (IPP)

determines whether each pixel (No. 0) on the main scanning line is a locally patent image pixel having a pixel level lower than a second threshold (TH2) among pixels having a flat pixel level higher than a first threshold (TH1) in a narrow region (i.e., between a pixel No. −5 and a pixel No. +5) in the main scanning direction based on the multi-value image data (s3 through s7), counts and stores in register R6 the number of lines on which locally patent image pixels are continuously detected at the same pixel position No. 0 in the main scanning direction as the previous line (s8) as scanning progresses in the sub-scanning direction, and replaces image data of the locally patent image pixel and its adjacent pixels within the narrow region (i.e., the pixels No. −5 through No. +5) having a pixel value smaller than the first threshold (TH1) with image data greater than the first threshold (TH1) if the counted number of lines exceeds the reference value (L).

According to the document reading apparatus described above, a noise line detection process is simply built. Here, in addition to detecting a locally patent image pixel by pattern matching, a filtering process and other peak point detection methods can be employed. According to an example of the filtering process, a large negative coefficient is multiplied by image data of pixels near the center of the narrow region, a small positive coefficient is multiplied by image data of pixels near the edge of the narrow region, the weighted pixel data are totaled, and a pixel at the center (target pixel) is determined to be a locally patent image pixel if the total is less than a predetermined value (e.g. zero).

(2) Another aspect of the present invention provides the document reading apparatus as described at (1) or (1a) above, wherein the reference value (L) is the number of lines in the sub-scanning direction, the number being equal to or greater than the product of the value eighteen and the width between the flat level of pixels on both ends of the width section, the width section being used in determining whether a locally patent image pixel is present.

(2a) Another aspect of the present invention provides the document reading apparatus as described in (1a) above, wherein the reference value (L) is the number of lines in the sub-scanning direction, the number being equal to or greater than a product of the value eighteen and a width that is the width of the narrow region (pixel No. −5 through pixel No. +5) less two pixels.

Here, a ratio "a" of a height H to a line breadth w of characters (fonts) is considered (a=H/w). In the case of a kanji character "朝" (signifying a morning) in the MS Mincho font system, for example, the ratio "a" is as great as 17.9 (about 18). The same kanji character in a bold letter, i.e., MS Mincho Gothic, "朝", the ratio "a" is about 13.3. In the case of "D" in MS Mincho Gothic, the ratio "a" is as small as about 8.4. Then, in the case of, for example, 300 dpi (=11.81 dpmm), the nine pixels (i.e., 11 pixels from the pixel No. −5 to the pixel No. +5, refer to FIG. 14B, less two edge pixels) are equal to 0.76 mm (9/11.81=0.76 mm), which is expressed by W (W=0.76 mm). That is, a noise line having a width up to W in the main scanning direction can be detected. Then, in order to remove the risk of mistaking an original image for a noise line, the reference value L is set at a product of the ratio "a" and W. Specifically, the greatest of the ratio "a", which is about 18, is used here, and a×W=18×0.76 mm=13.68 mm, which is expressed by H. By setting the value H as the reference value L, a noise line of which line breadth (thickness) is W=0.76 mm or less can be detected without a character (stroke thereof) of which height is equal to or less than H=13.68 mm being mistaken for a noise line. Although the noise line from the starting edge to a 13.68 mm point in the sub-scanning direction cannot be removed, and remains, it is usually within the top margin of the paper, and the noise line in excess of the 13.68 mm point, and down to the end of sub-scanning is removed.

(3) Another aspect of the present invention provides the image reading apparatus as described in (1) and (2) above, wherein the image data processing unit initializes the count value of the number of lines when a locally patent image pixel is not continuously detected as scanning proceeds in the sub-scanning direction.

According to the document reading apparatus as described above, although the noise line from the starting edge to the position corresponding to the reference value L in the sub-scanning direction remains, the noise line extending beyond the point down to the ending edge is removed, if the noise line is otherwise present from the starting edge continuously through the ending edge in the sub-scanning direction. In the case that the noise line is not continuous but appears in sections with interruptions, the noise line from the starting position of each section to a distance corresponding to the reference value L of the section remains, and a portion beyond the distance is removed. In the case that a noise line does not appear in the beginning, but appears as sub-scanning progresses to some extent, a little less than the full length of the noise line is removed. For this reason, according to this embodiment, a relatively short straight line parallel to the sub-scanning direction, a big font beyond assumption, and a line drawing may be mistaken for a noise line, and may be removed. Therefore, this embodiment is suitable for reading a document that carries only standard characters.

(4) Another aspect of the present invention provides a document reading apparatus including a document scanning unit (10) that includes an image pickup device (207) constituted by a photo-electric-conversion element array having a great number of photo-electric-conversion elements that are arranged in an array in the main scanning direction, the document reading apparatus repeatedly outputting an image signal read by the array in a main scanning line partition, a converting unit configured to convert the image signal into multi-value image data corresponding to pixels of the main scanning line, an optical system constituted by optical system components (232 through 236) configured to project a document image to the image pickup device, and a sub-scanning unit (30/238) configured to drive one of the optical system and the document in relation to the other in the sub-scanning direction; and an image data processing unit (IPP) configured to determine whether each pixel on the main scanning line is a locally patent image pixel having a high image level based on the multi-value image data, to count the number of lines that have a locally patent image pixel at the same pixel position on the main scanning line as lines to scan are changed by sub-scanning, to initialize the counting value if detection of a locally patent image pixel does not continue, to stop counting when an amount of sub-scanning from the starting edge of a document reaches a reference value, and to rectify image data of locally patent image pixels at the same pixel position, when the number of lines exceeds the reference value such that the image data of the locally patent image pixels are equalized.

In this manner, when a noise line appears from the sub-scanning starting edge to the distance equivalent to the reference value L of a document and afterwards, even if the noise line disappears further down, the noise line is completely removed after the reference value L equivalent position down to the sub-scanning ending edge. In the case that a noise line is intermittent between the starting edge and the distance equivalent to the reference value L, detection of the noise line is not performed, and the noise line is not removed. That is, when a noise line appears from the sub-scanning starting edge until sub-scanning progresses to a certain extent, the noise line is completely removed afterwards down to the end of sub-scanning. Accordingly, a relatively short straight line in the sub-scanning direction, a character greater than assumed, and a line drawing are not mistaken for a noise line, unless they extend to the sub-scanning starting edge of the document.

(4a) Another aspect of the present invention provides the document reading apparatus as described above (4), wherein the image data processing unit (IPP)

generates information (register R8="1") that it is a locally patent image pixel, and provides the information to the locally patent image pixel and adjacent pixels inside of the end pixels of the narrow region (pixel No. −5 through pixel No. +5) when the amount of sub-scanning from the sub-scanning starting edge of the document becomes greater than the reference value (L), and rectifies image data of locally patent image pixels at the same pixel position, when the number of lines exceeds the reference value (L) such that the image data of the locally patent image pixels are equalized.

(5) Another aspect of the present invention provides the document reading apparatus as described in (1) through (4) wherein the image data processing unit includes a data memory (146) configured to hold property convention data that specify properties of a data process of detecting locally patent image pixels, and set up the reference value, two or more processing elements (PE), each processing respectively assigned multi-value image data according to the property convention data held by the data memory, and processing control unit (148) configured to hold process control data for controlling the data processing of the processing element provide operating directions commonly to each processing element (PE) based on the process control data, and control distribution of a series of processing object data sets to each processing element, providing the property convention data held by the data memory, and outputting of data after processing from each processing element.

According to the document reading apparatus described above, the processing elements (PEs) simultaneously detect in parallel whether two or more pixels in the main scanning direction are locally patent image pixels, and removal of two or more noise lines can be performed at high speed. As one of the embodiments of the present invention, an example is described below, where parallel detection of locally patent image pixels is carried out for reading an A4-size document at a resolution of 300 dpi.

(5a) Another aspect of the present invention provides the document reading apparatus given in the above (5), wherein the processing control unit (148) includes a global register (149) configured to hold process control data that control image data processing performed by the processing elements (PE), and commonly provide the process control data to each processing element (PE), and a processor (148) that controls distributing a series of image data sets to each processing element (PE), providing the property convention data held by the data memory (146), providing each processing element (PE) in common with the operating directions based on the process control data, and outputting the data after processing from each processing element (PE).

(5b) Another aspect of the present invention provides the document reading apparatus given in above (5a) that further includes a program memory (145) configured to hold a process program performed in order that the processor (148) may carry out the control.

(5c) Another aspect of the present invention provides the document reading apparatus given in above (5a), wherein each processing element (PE) includes registers (R0 through R31) configured to input/output image data, the property convention data, and the data after processing, and a computing element configured to process the image data according to the operating directions based on the property convention data and process control data provided by the processor (148).

(6) The present invention further provides an image formation apparatus that includes a printer (100) for forming an image for a record output expressed by image data, and the document reading apparatus {10 is a scanner only} as described in any one of (1) through (5c) above, wherein the image data processing unit (IPP) of the document reading apparatus performs gamma conversion such that the image data, which are compensated for as described above, are converted to image data for a record output suitable for image formation by the printer.

Here, an image data processing unit (IPP) carries out the gamma conversion such that the document image is faithfully expressed according to image expression properties of the printer (100). Alternatively, gamma conversion according to adjustment or compensation operation by a user may be made available. In either manner, the effect described in any one of (1) through (4) above is acquired.

(7) Another aspect of the present invention provides the image formation apparatus as described in (6) above that further includes a parallel bus (Pb) for transferring image data, an image memory (MEM), an image memory control unit (IMAC) that writes the image data on the parallel bus to the image memory, and reads the image data in the image memory to the parallel bus, and an image data control unit (CDIC) that controls exchange of the image data between the image data processing unit (IPP) and the parallel bus (Pb).

Print out is carried out by, for example, the image memory control unit (IMAC) controlling so that the image data of image memory (MEM) are read to the parallel bus (Pb), and the image data control unit (CDIC) providing the image data on the parallel bus (Pb) to the image data processing unit (IPP) such that the output image data are provided to the printer (100) for printing.

(8) Another aspect of the present invention provides the image formation apparatus as given in (7) above, wherein the image memory control unit (IMAC) compresses the image data when writing to the image memory (MEM), and decompresses (expands) the image data when reading from the image memory (MEM), the image data being exchanged between external instruments such as a personal computer and LAN, a facsimile apparatus connected to the parallel buses, and the image data control unit (CDIC).

According to the image formation apparatus describe above, advanced image processing and editing can be performed by storing the image data in the image memory (MEM), and in addition, the image memory control unit (IMAC) can exchange the image data between external instruments such as a personal computer and LAN, a facsimile apparatus connected to the parallel bus, and the image data control unit (CDIC). When exchanging and printing the image data, the image data processing unit (IPP) can process the image data at high speed.

DESCRIPTION OF the PREFERRED EMBODIMENTS

The present invention together with other objectives and features of the present invention will become clearer by the following description of the embodiments with reference to the accompanying drawings.

Example

First Embodiment

Figure 1:
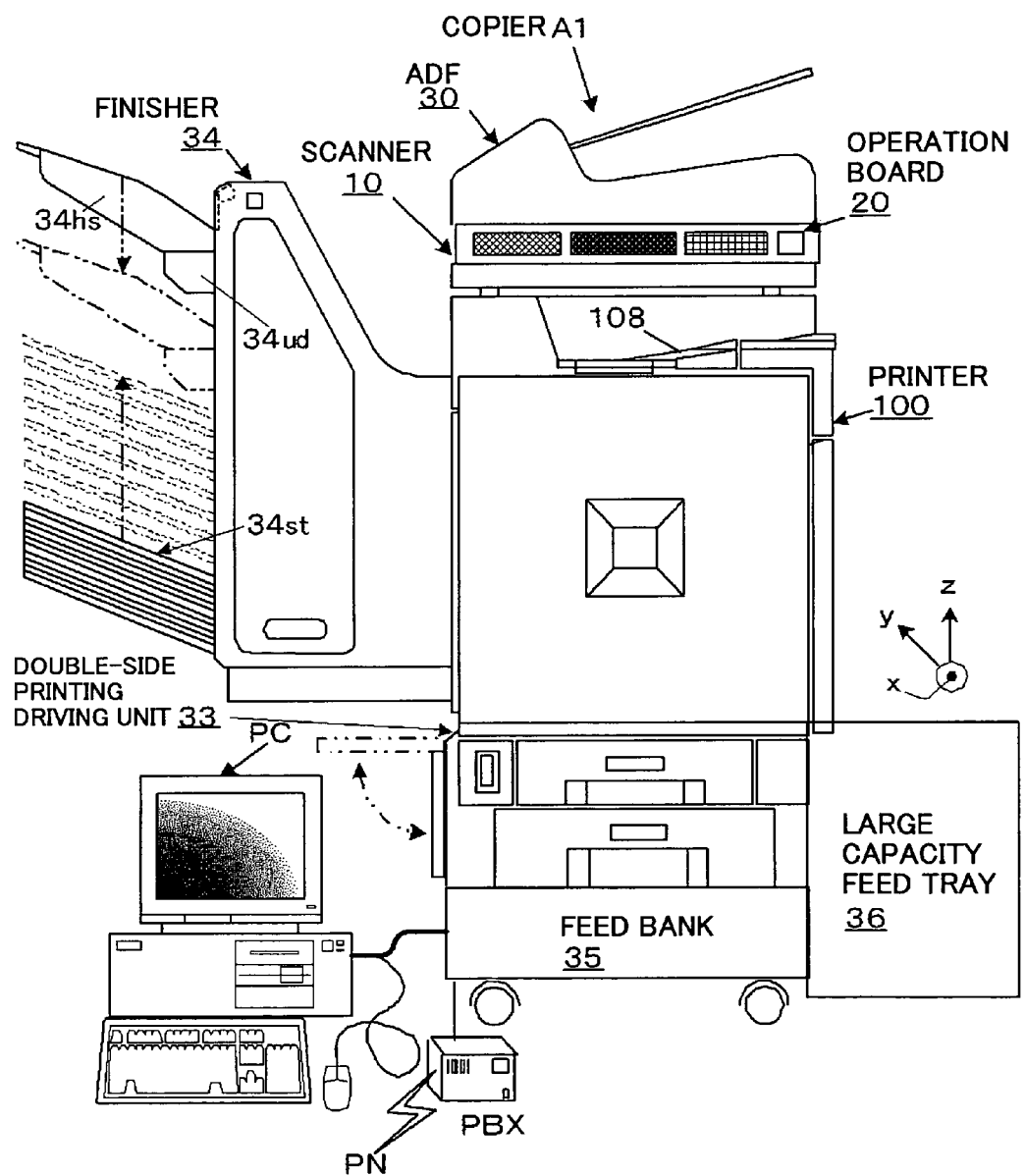
FIG. 1 is a front view of a copier A1, which is a multi-function full color copier, according to an embodiment of the present invention, illustrating a scanner 10, a printer 100, and an operating board 20 among other things.

FIG. 1 shows the external appearance of a copier A1, which is a multi-function full color digital copier, according to the embodiment of the present invention. The copier A1 includes an automatic document feeder (ADF) 30, an operating board 20, a color scanner 10, a printer 100, and a feed bank 35. The printer 100, which is a color printer, includes a finisher 34 equipped with a stapler and a tray for storing printed sheets of paper, a double-side printing driving unit 33, and a large capacity paper tray 36.

The copier A1 includes an image data processor ACP (ref FIG. 4) that is connected to a LAN (Local Area Network) that is connected to a personal computer PC such that the PC and ACP can be connected to a wide area network B, such as the Internet, through a router. A facsimile control unit FCU (ref FIG. 4) is connected to a switchboard PBX that is connected to a public telephone network PN (facsimile communication line). A form printed by the printer 100 is discharged to one of a delivery tray 108 and the finisher 34.

Figure 2:
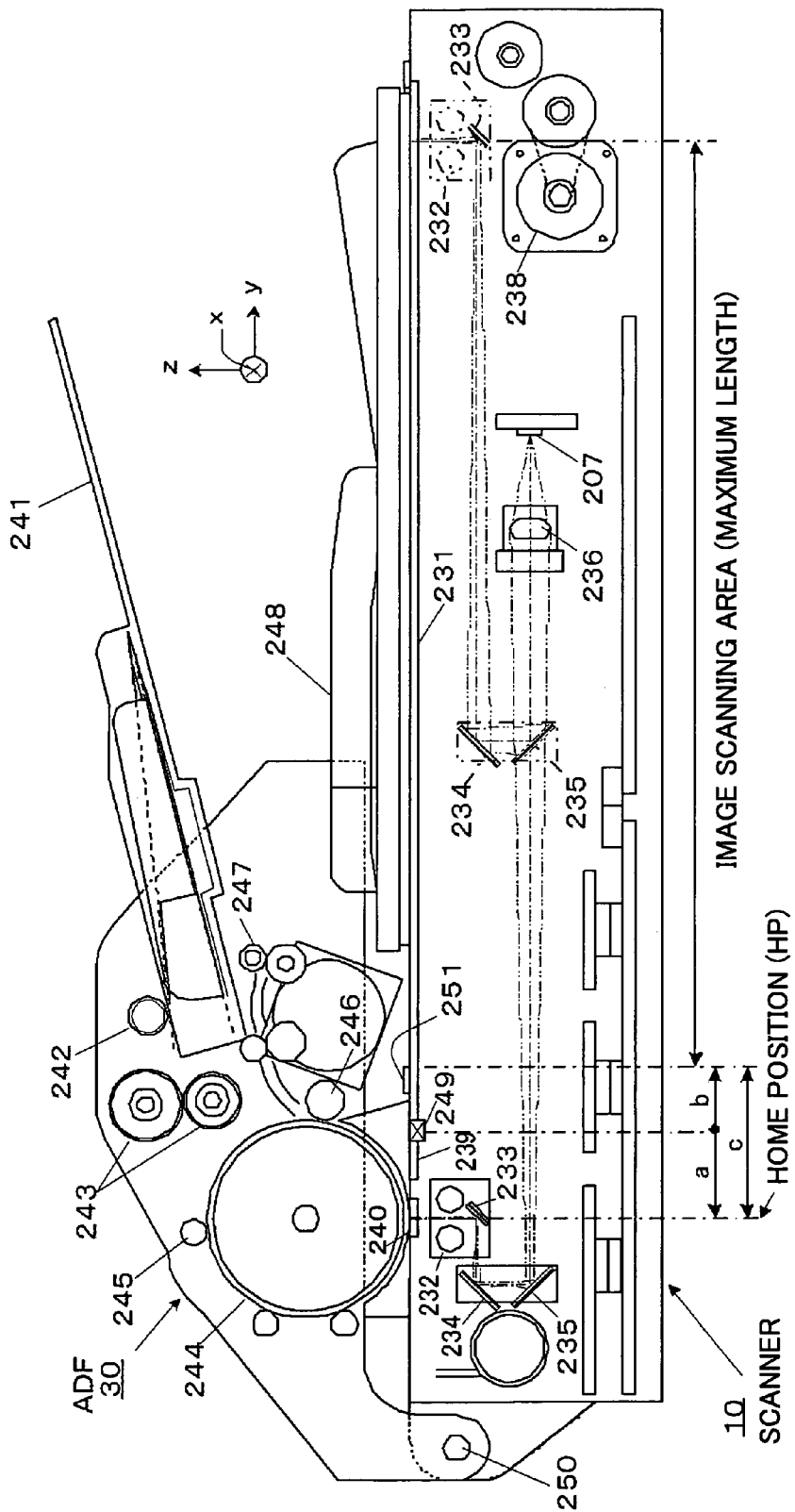
FIG. 2 is an enlarged cross-sectional view showing the outline of a reading mechanism of the scanner 10 shown in FIG. 1.

FIG. 2 shows the document reading mechanism of the scanner 10 that includes the ADF 30. A lamp 232 irradiates a light and illuminates a document placed on a contact glass 231 of the scanner 10, and the document reflects the light (image light), which is then reflected by a first mirror 233 in the direction y, i.e., the sub-scanning direction. The lamp 232 and the first mirror 233 are mounted on a first carriage (not shown), and are carried in the direction y at a constant speed. Second and third mirrors 234 and 235 are mounted on a second carriage (not shown) that is driven in the direction y at half the speed of the first carriage. The image light that is reflected by the first mirror 233 is then reflected by the second mirror 234 in the direction z (downward), is further reflected by the third mirror 235 in the direction y, and is focused by a lens 236. Then, the focused light is irradiated to a CCD 207, and an electrical signal is generated (reading of a document manually placed on the contact glass). The first and second carriages are driven by a motor 238 in the direction y for document scanning, and back. The CCD 207 is an image pickup device having a photo-electric-conversion device array consisting of a great number of photo-electric-conversion elements arranged in the main scanning direction, and repeatedly outputs an image reading signal of the array elements in main scanning line partitions.

As shown in FIG. 2, the scanner 10 includes the automatic document feeder ADF 30. A document loaded to a document tray 241 of the ADF 30 is sent in-between a conveyance drum 244 and a pressing roller 245 by a pickup roller 242 and a resist roller pair 243. Then, the document is adhered to the conveyance drum 244, travels on a reading glass 240, and is delivered onto a delivery tray 248 by delivery rollers 246 and 247. The delivery tray 248 is located below the document tray 241, and also serves as a pressurizing plate. When the document travels on the reading glass 240, it is irradiated by the lamp 232 that is fixed at a predetermined position directly under the reading glass 240, and the light reflected by the document is irradiated to the CCD 207 through the optical system including the first mirror 233, and the like, such that the photo electric conversion is carried out (sheet feed method).

A reference point sensor 249 that detects the first carriage, and a white reference board 239 are provided between the reading glass 240 and a scale 251 for positioning the starting edge of the document. The white reference board 239 is prepared in order to compensate for a phenomenon called shading, which is a non-uniformity in the read data despite that the document has a uniform concentration, and is caused by a variation in luminous intensity of the lamp 232, a variation in the main scanning direction, an unevenness of sensitivity of pixels of the CCD 207, and so on. The shading compensation is carried out by first reading a line of the white reference board 239 in the main scanning direction before the document is scanned, holding the read white reference data in a memory, by reading the document image, and by dividing document image data of a pixel by the white reference data of the corresponding pixel, the white reference data being held in the memory.

Figure 3:
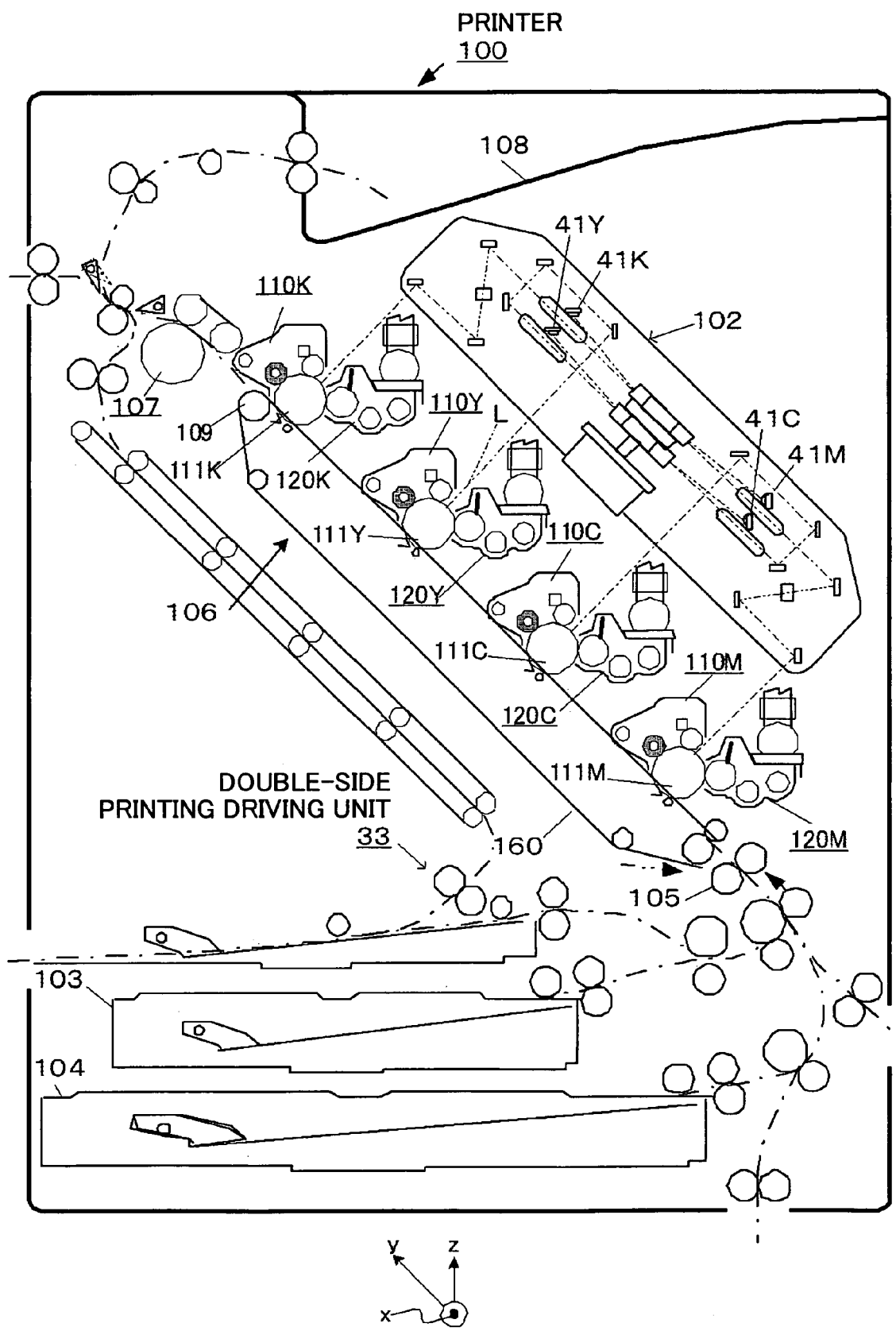
FIG. 3 is an enlarged cross-sectional view showing the outline of an imaging mechanism of the printer 100 shown in FIG. 1.

FIG. 3 shows the mechanism of the printer 100, which is a laser beam printer according to the present embodiment. The printer 100 includes four sets of toner image forming units for forming images in magenta (M), cyan (C), yellow (Y), and black (K), the four sets being arranged in this sequence along the moving direction of imprint paper (in the direction y, i.e., from the lower right to the upper left in FIG. 3). That is, the printer 100 is a full color image formation apparatus of a quadruple tandem system.

The magenta (M), cyan (C), yellow (Y), and the black (K) toner image forming units are equipped with photo conductor units 110M, 110C, 110Y, and 110K, respectively, which include photo conductor drums 111M, 111C, 111Y, and 111K, respectively, and development units 120M, 120C, 120Y, and 120K, respectively. Further, the toner image forming units are arranged such that the rotational axes of the photo conductor drums 111M, 111C, 111Y, and 111K may become parallel to the x axis, i.e., the main scanning direction at a predetermined pitch to the imprint paper moving direction, the direction y, i.e. the sub-scanning direction.

The printer 100 further includes a laser exposure unit 102 for laser scanning, feed cassettes 103 and 104, a resist roller pair 105, an imprint belt unit 106 that includes an imprint conveyance belt 160 for conveying imprint paper through imprint positions of the toner image forming units, a fixing unit 107 of a belt fixing method, a delivery tray 108, and a double-side printing driving unit 33 for printing on both sides of the imprint paper. Further, the printer 100 includes a manual feeding tray, a toner supply container, and an exhaust toner bottle that are not illustrated.

The laser exposure unit 102 includes laser luminous sources 41M, 41C, 41Y, and 41K, polygon mirrors, f-θ lenses, reflective mirrors, and the like, such that laser beams are irradiated to the surface of the photo conductor drums 111M, 111C, 111Y, and 111K, respectively, the laser beams being scanned according to the image data in the main scanning direction x that is perpendicular to the paper of this specification.

In FIG. 3, a conveyance path of the imprint paper is indicated by an alternate long and short dashed line. The imprint paper supplied by the feed cassette 103 or 104 is conveyed by conveyance rollers, being guided by a conveyance guide that is not illustrated, and reaches a resist roller pair 105. The imprint paper is brought to the imprint conveyance belt 160 by the resist roller pair 105 at a predetermined timing, is supported by the imprint conveyance belt 160, and is further conveyed passing through the imprint positions of the toner image forming units.

Toner images formed on the photo conductor drums 111M, 111C, 111Y, and 111K of each toner image forming unit are transferred to the imprint paper that is supported and conveyed by the imprint conveyance belt 160 such that the toner images are superposed to form a color image, and the imprint paper is conveyed to the fixing unit 107. That is, a direct imprint method that directly imprints a toner image on the imprint paper is employed. When passing the fixing unit 107, the color image is fixed to the imprint paper. The imprint paper in which the color image is fixed is conveyed to one of the delivery tray 108, finisher 36, and the double-side printing driving unit 33.

The outline of the toner image forming unit of Yellow Y is explained below. Configurations of other toner image forming units are the same as the toner image forming unit of Yellow Y. The toner image forming unit of Yellow Y includes the photo conductor unit 110Y and the development unit 120Y as mentioned above. The photo conductor unit 110Y includes, in addition to the photo conductor drum 111Y, a brush roller that applies lubricant to the photo conductor drum surface, a rock-able blade that cleans the photo conductor drum surface, an electric discharge lamp that irradiates a light to the photo conductor drum surface, and a non-contacting type electrification roller that carries out uniform electrification of the photo conductor drum surface.

When a laser beam L modulated by print data is irradiated by the laser exposure unit 102, is deflected by the polygon mirror, and scans the surface of the photo conductor drum 111Y that is uniformly electrically charged by the electrification roller to which an AC voltage is applied, an electrostatic latent image is formed on the surface of the photo conductor drum 111Y. The electrostatic latent image on the photo conductor drum 111Y is developed by the development unit 120Y, and turns into a toner image of Yellow Y. While the imprint conveyance belt 160 conveys the imprint paper, at the imprint position, the toner image on the photo conductor drum 111Y is imprinted onto the imprint paper. After the toner image is imprinted, the brush roller applies lubricant of predetermined quantity to the surface of the photo conductor drum 111Y, the blade cleans the surface, and the surface is discharged by a light irradiated from the electric discharge lamp such that the photo conductor drum 111Y is ready for the next latent image formation.

The development unit 120Y contains a 2-component developer consisting of a magnetic carrier and a toner of negative electrical charge. The development unit 120Y includes a developing roller arranged so that it is exposed at an opening of the development unit 120Y on the side of the photo conductor drum, a conveyance screw, a doctor blade, a toner concentration sensor, a fine-particle pump, etc. The developer contained in the development unit is electrically charged by friction due to churning conveyance by the conveyance screw. Then, a part of the developer is supported by the surface of the developing roller. The doctor blade regulates the thickness of the developer on the surface of the developing roller uniformly, the toner being developed on the surface of the developing roller moves to the photo conductor drum, and, in this manner, the toner image corresponding to the electrostatic latent image appears on the photo conductor drum 111Y. The toner concentration sensor detects the toner concentration of the developer in the development unit. When the concentration is low, the fine-particle pump drives such that the toner is supplied.

The imprint conveyance belt 160 of the imprint belt unit 106 is installed with tension applied by four grounded tension rollers, and passes through each imprint position that faces and contacts the respective photo conductor drums 111M, 111C, 111Y, and 111K of the respective toner image forming units. One of the tension rollers is identified as 109. Another tension roller indicated by a two-point chain-line arrow of the four tension rollers is an entrance roller, and is arranged in the upstream section of the imprint paper movement. The entrance roller is installed so that it counters an electrostatic adsorption roller, to which a predetermined voltage is applied from a power source. The imprint paper that passes between the entrance roller and the adsorption roller is electrostatically adhered to the imprint conveyance belt 160. Further, an exit roller arranged in the downstream section of the imprint paper movement carries out friction driving of the imprint conveyance belt, and is connected to a driving source that is not illustrated. Further, a bias roller is arranged on the outer side of the imprint conveyance belt 160 such that the bias roller contacts the imprint conveyance belt 160, a predetermined voltage for cleaning being applied to the bias roller by a power source. The bias roller removes foreign substances, such as toner powder adhered to the imprint conveyance belt 160.

Further, imprint bias impression members are provided contacting the rear (inner) side of the imprint conveyance belt 160, forming contact facing sections that contact and face the photo conductor drums 111M, 111C, 111Y, and 111K. The imprint bias impression members are fixed brushes made from mylar, for example, each brush applying an imprint bias voltage to the respective member. An imprint charge is provided to the imprint conveyance belt 160 by an imprint bias applied by the imprint bias impression members, and an imprint electric field of predetermined intensity is formed between the imprint conveyance belt 160 and the photo conductor drum surface at each imprint position.

The imprint paper, to which each color toner image is imprinted by the photo conductor drums 111M, 111C, 111Y, and 111K while being conveyed by the imprint conveyance belt 160, is brought to the fixing apparatus 107, where the toner image is thermally fixed by heating and pressurizing the imprint paper. Then, after thermal fixing, the imprint paper is brought to the finisher 34 from a delivery mouth 34*ot* (not shown) located at the upper part of a left-hand side board. Alternatively, the imprint paper is discharged to the delivery tray 108 located at the upper surface of the main part of the printer.

The photo conductor drums 111M, 111C, and 111Y for image formation in the three colors, namely M, C and Y, respectively, are driven by a color drum motor M (not shown), which is an electric motor, through a power transfer system and a reduction gear (not shown). Another electric motor, a black drum motor (a K drum motor) (not shown), drives the photo conductor drum 111K for black image formation through a power transfer system and a reduction gear (not shown). The K drum motor further drives an imprint drive roller through the power transfer system such that the imprint conveyance belt 160 is rotationally driven. In summary, the K drum motor drives the K photo conductor drum 111K and the imprint conveyance belt 60, and the color drum motor drives the photo conductor drums 111M, 111C, and 111Y.

Further, the development unit 120K for black color is driven by an electric motor (not shown) that drives the fixing unit 107 through a power transfer system and a clutch (not shown). The development units 120M, 120C, and 120Y for M, C, and Y colors, respectively, are driven by an electric motor (not shown) that drives the resist roller 105, and are driven through a power transfer system and a clutch (not shown). The development units 120M, 120C, 120Y, and 120K are driven through the clutch at a predetermined timing when required, i.e., are not continuously driven.

FIG. 1 is referred to again. The finisher 34 includes a stacker tray, i.e., a loading descent tray 34*hs*, and a group of sort trays 34*st*. The finisher 34 operates in two modes, namely, a stacker delivery mode wherein the imprint paper is delivered to the loading descent tray 34*hs*, and a sorter delivery mode wherein the imprint paper is delivered to the group of sort trays 34*st*.

The imprint paper delivered to the finisher 34 from the printer 100 is conveyed in the direction of the upper left, and passes through a reversed-U type conveyance way, i.e., makes a U-turn downward. Then, according to the mode set up, the imprint paper is discharged to the loading descent tray 34*hs* from a discharge port in the stacker delivery mode, and is discharged to the group of sorter trays 34 in the sorter delivery mode.

In the sorter delivery mode, a delivery controller of the finisher drives the group of sort trays 34*st*. The group of sort trays 34 is placed at the bottom part with the trays being stacked when not being used. The delivery controller drives the group of sort trays 34 upward to the operating position from the standby position as shown by the two-point chain line in FIG. 1, and the intervals between sorter trays are expanded. The sorter delivery mode further operates in two modes, namely, set sorting and page sorting modes. In the set sorting mode, each page is distributed to each tray of the group of sort trays 34*st*. In the page sort mode, each tray is assigned to each page, and all copies of the same page are loaded to the same tray.

Figure 4:
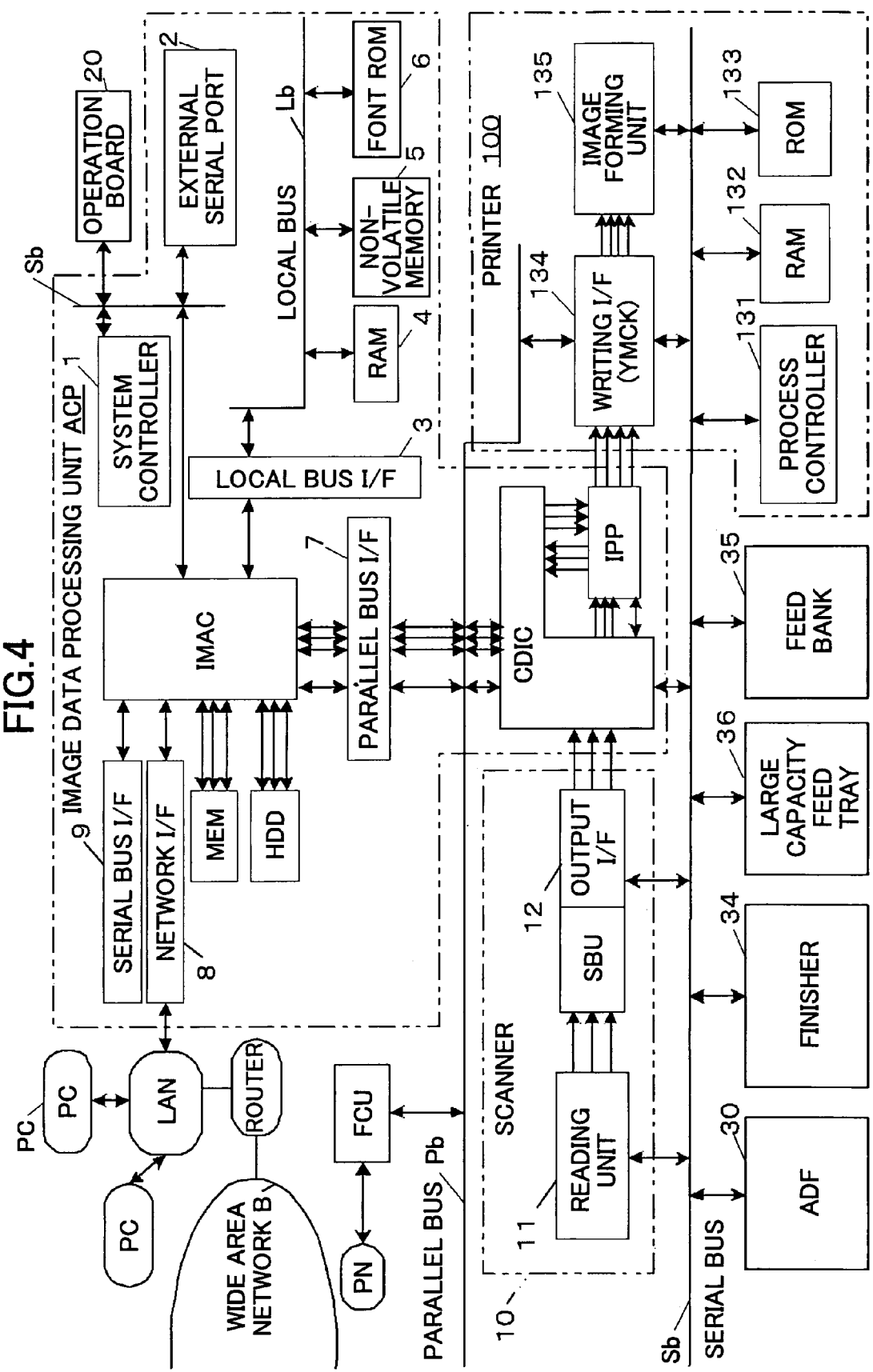
FIG. 4 is a block diagram showing the outline of an image processing system of the copier A1 shown in FIG. 1.

FIG. 4 shows a system configuration of an image processing system of the printer 100 shown in FIG. 1. The system includes the scanner 10 that includes a reading unit 11 and an image data output interface (I/F) 12, the scanner 10 being capable of scanning a color document. The scanner 10 is connected to the image data interface control CDIC of the image data processor ACP. The printer 100 is connected to the image data processor ACP. In the printer 100, image data are provided from the image data processing unit IPP (Image Processing Processor) of the image data processor ACP to a writing I/F 134 such that an image forming unit 135 prints out the image according to the image data. The image forming unit 135 is as shown in FIG. 3.

The image data processor ACP includes a parallel bus Pb, an image memory access control IMAC, a memory module MEM serving as an image memory, a hard disk drive unit HDD serving as a non-volatile memory, a system controller 1, RAM 4, a non-volatile memory 5, a font ROM 6, the CDIC, and the IPP. Further, a facsimile control unit FCU is connected to the parallel bus Pb, and the operating board 20 is connected to the system controller 1.

The reading unit 11 of the scanner 10 for optically reading the document carries out the photo electric conversion of the reflected light of the lamp irradiation to the document by the CCD 207 (FIG. 2) mounted on a sensor board unit SBU, generates R, G, and B image signals, converts the R, G, and B image signals into RGB image data by an A/D converter, carries out shading compensation, and provides the shading compensated RGB image data to the CDIC through the output I/F 12. The RGB image data are multi-value image data structured by 3 or more bits (for example, an 8-bit structure) expressing a great number of gradation scale levels.

The CDIC performs data transfer of the image data between the scanner 10 (the output I/F 12), the parallel bus Pb, and the IPP; and communications between the process controller 131 and the system controller 1 that controls the entirety of the ACP. Further, a RAM 132 serves as a work area of the process controller 131, and a ROM 133 stores an operations program, and the like, of the process controller 131.

The image memory access control unit IMAC controls writing/reading of the image data and control data to/from the MEM and HDD. The system controller 1 controls operations of components that are connected to the parallel bus Pb. Further, the RAM 4 serves as a work area of the system controller 1, and the non-volatile memory 5 stores an operations program, and the like, of the system controller 1.

Processes that ACP should perform are directed through the operating board 20. For example, kinds of process (copying, facsimile transmission, image reading, printing, etc.), the number of sheets to be processed, etc., are input. Image data control information is input in this way.

The image data read from the reading unit 11 of the scanner 10 are processed through a shading compensation by the SBU of the scanner 10, providing image processing of compensating for reading distortion such as noise line removal, background color complexion removal, scanner gamma correction, and filtering by the IPP. Then, the processed image data are stored in the MEM or HDD as required. When the image data in the MEM or HDD, as applicable, is to be printed out, the IPP carries out color conversion, i.e., the RGB signal is converted into a YMCK signal, and carries out an image property process such as a gradation process including printer gamma conversion, gradation conversion, dither processing, error diffusion processing, and the like. Then, the processed image data are output. The writing I/F 134 performs laser control by pulse width and power modulation according to the processed image data. Then, the image data are provided to the imaging unit 135, and the imaging unit 135 reproduces the image on the imprint paper.

The IMAC performs access control of the image data to/from the MEM or HDD, as applicable, expansion of the data for printing by a personal computer PC connected to the LAN, and compression/decompression of the image data for efficient use of the MEM and HDD based on the control of the system controller 1.

The image data provided to the IMAC are compressed, and then stored to the MEM or HDD. When the stored image data are read, the image data are decompressed, and the original image data are recovered. The recovered image data are returned to the CDIC via the parallel bus Pb from the IMAC. Then, the image data are provided to the IPP, image property processed, provided to the I/F 134, and the imaging unit 135 reproduces the original image.

The multi-functions of the digital multi-function copier are realized by the CDIC controlling the parallel bus Pb. Facsimile transmission is performed by carrying out image processing in the IPP and transmitting the read image data to the FCU via the CDIC and the parallel bus Pb. The FCU performs data conversion to the communication network, and transmits the data to the public network PN as facsimile data. Facsimile reception is performed by converting the data from the public line PN into image data by the FCU, and by transmitting the image data to the IPP via the parallel bus Pb and CDIC. In this case, the image property process is not performed, but the data are output from the writing I/F 134, and a reproduction image is formed on the imprint paper by the imaging unit 135.

When two or more jobs, for example, the copying function, the facsimile transceiver function, and the printer output function are to be carried out in parallel, the system controller 1 and the process controller 131 control assignment of the resources (the reading unit 11, the imaging unit 135, and the parallel bus Pb) to the jobs. The process controller 131 controls the flow of the image data, and the system controller 1 controls the whole system and manages invoking of each resource. Here, a selection of function of the digital multi-function machine is performed by the operating board 20, which sets up the kinds of processing, such as a copy function and a facsimile function, by inputting the selection to the operating board 20.

The system controller 1 and the process controller 131 mutually communicate through the parallel bus Pb, CDIC, and a serial bus Sb. Specifically, communications between the system controller 1 and the process controller 131 are performed by the CDIC performing data-format conversion of the data and interface between the parallel bus Pb and the serial bus Sb.

Various bus interfaces such as a parallel bus I/F 7, a serial bus I/F 9, a local bus I/F 3, and a network I/F 8 are connected to the IMAC. The controller unit 1 is connected to other units via the buses in order to maintain independence in the ACP.

The system controller 1 controls other functional units through the parallel bus Pb. Further, transfer of image data is performed through the parallel bus Pb. The system controller 1 issues an operations control instruction to the IMAC for storing the image data in the MEM and HDD. The operations control instruction is provided via the IMAC, the parallel bus I/F 7, and the parallel bus Pb.

In response to the operations control instruction, the image data are provided from the CDIC to the IMAC through the parallel bus Pb and the parallel bus I/F 7. Then, the image data are stored in the MEM or HDD as applicable by control of the IMAC.

On the other hand, if the printer function is called for from the PC, the system controller 1 of the ACP functions as a printer controller, a network controller, and a serial bus controller. In the case that the printer function is requested from the network B, the IMAC receives one of a print output request and a storing request through the network I/F 8. The request from the network B is provided to the system controller 1. The system controller 1 issues an appropriate command in response to the request, and the IMAC executes the command.

In the case of a general-purpose serial bus connection, the IMAC receives the printing request via the serial bus I/F 9. The general-purpose serial bus I/F 9 complies with two or more specifications, for example, the interface specifications of USB (Universal Serial Bus), 1284, and 1394.

The data of which printing is requested by the PC are expanded to image data by the system controller 1. The expansion takes place at an area of the MEM. Font data required for expansion are obtained by referring to the font ROM 6 via the local bus I/F 3 and a local bus Lb. The local bus Lb provides connections between the system controller 1, the non-volatile memory 5 and the RAM 4.

The serial bus Sb serves as an interface to the operational board 20, which is the control unit of the ACP, in addition to connecting an external serial port 2 for connection to the PC. This channel is not for developed data print, but communicates with the system controller 1 via the IMAC such that operational processes are received, a system status is displayed, and so on.

Data transmission and reception between the system controller 1, MEM, HDD and various buses are performed via the IMAC. Jobs that use the MEM and HDD are controlled solely by the ACP.

Figure 5:
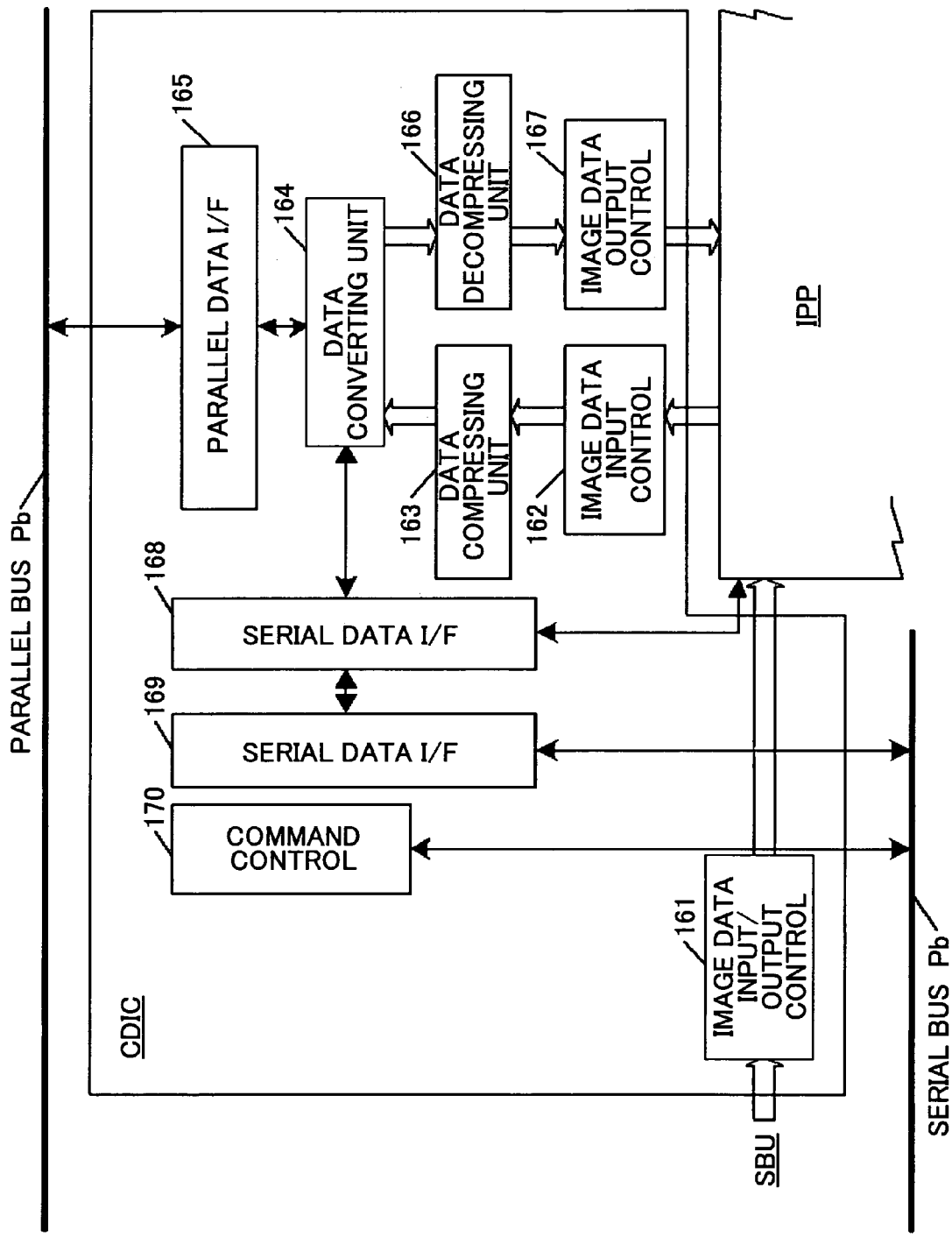
FIG. 5 is a block diagram of an image data interface control unit CDIC shown in FIG. 4.

The outline functional structure of the CDIC is shown in FIG. 5. There, an image data input/output control 161 receives image data from the scanner 10 (mounted on the SBU), and outputs the image data to the IPP. The IPP carries out a scanner image process 190 (FIG. 7), and outputs the processed image data to an image data input control unit 162 of the CDIC. The image data input control 162 provides the received image data to a data compressing unit 163 that performs primary compression of the image data in order to raise the transfer efficiency through the parallel bus Pb. The compressed image data are converted into parallel data by a data converting unit 164, and the converted data are sent out through the parallel data I/F 165 to the parallel bus Pb. Conversely, image data received from the parallel data bus Pb through the parallel data I/F 165 are converted into serial data by the data converting unit 164. Since the image data at this point are compressed for the bus transfer, a data decompressing unit 166 expands (decompresses) the image data. Then, an image data output control unit 167 provides the expanded image data to the IPP. The image data, which are RGB image data, are converted into YMCK image data by an print image property process 300 (FIG. 7) of the IPP, which YMCK data are further converted into printing image data YpMpCpKp, and printed by the printer 100.

The CDIC has a serial/parallel conversion function for converting one of parallel data provided by the parallel bus Pb and serial data provided by the serial bus Sb to the other. The system controller 1 provides data to the parallel bus Pb, and the process controller 131 provides data to the serial bus Sb. For communication of the system controller 1 and the process controller 131, the data converting unit 164 and the serial data I/F 169 perform parallel/serial data conversion. The serial data I/F 168 is for interfacing with the IPP, and carries out a serial data transfer with the IPP.

Figure 6:
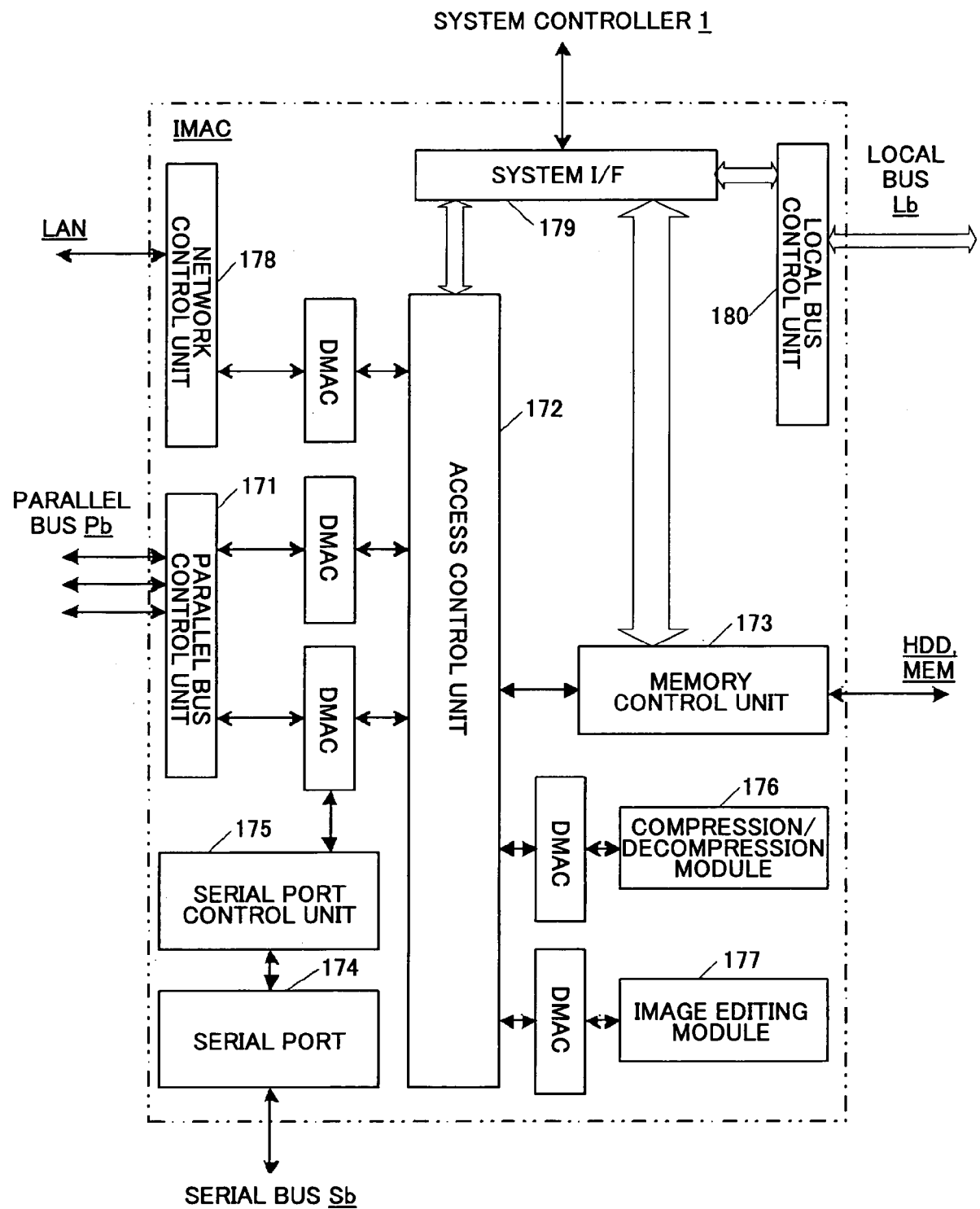
FIG. 6 is a block diagram of an image memory access control unit IMAC shown in FIG. 4.

The outline structure of the IMAC is shown in FIG. 6. The IMAC includes an access control unit 172, a memory control unit 173, a secondary compression/decompression module 176, an image editing module 177, a system I/F 179, a local bus control unit 180, a parallel bus control unit 171, a serial port control unit 175, a serial port 174, and a network control unit 178. The secondary compression/decompression module 176, the image editing module 177, the parallel bus control unit 171, the serial port control unit 175, and the network control unit 178 are connected to the access control unit 172 through DMAC (direct memory access control) units.

The system I/F 179 transmits and receives instructions and data to/from the system controller 1. Fundamentally, the system controller 1 controls the entire ACP. Further, the system controller 1 manages the resource allocation of the MEM and HDD, and controls other units through the system I/F 179, the parallel bus control unit 171, and the parallel bus Pb.

Each of the units included in the ACP is fundamentally connected to the parallel bus Pb. Therefore, the parallel bus control unit 171 manages the transmission and reception of data to/from the system controller 1, and MEM and HDD by controlling bus occupancy.

The network control unit 178 controls connections with a network such as a LAN. The network control unit 178 manages the transmission and reception of data to/from an external device connected to the network. Here, although the system controller 1 does not participate in management of the external devices on the network, it controls interfacing of the IMAC. The present embodiment additionally provides control of 100BASE-T, as an option with no limitation to the scope of the invention.

The serial port 174 connected to the serial bus Sb provides two or more ports. The serial port control unit 175 is capable of controlling the ports, the number of which corresponds to the number of kinds of buses that are provided. With no limitation to the scope of the invention, the present embodiment provides a port control for USB and 1284. Further, in addition to controlling the serial ports, the serial port control unit 175 controls transmission and reception of the data about command reception and display of the operating board 20.

The local bus control unit 180 interfaces with the local bus Lb, which is a serial bus. The local bus Lb connects the font ROM 6 that expands printing code data, the RAM 4 required in order to start the system controller 1, and the non-volatile memory 5.

Operations control is carried out by a command control of the system controller 1 from the system I/F 179. Data control manages accesses from an external unit to the MEM and HDD. Image data are provided from the CDIC to the IMAC through the parallel bus Pb. The image data are taken in to the IMAC by the parallel bus control unit 171.

The memory access of the taken-in image data is separate from management of the system controller 1. That is, the memory access is performed by direct memory access control (DMAC) independently of the system control. The access control unit 172 arbitrates access demands to the MEM and HDD from two or more sources. The memory control unit 173 controls access operations to the MEM and HDD, and read-out/writing of data.

When accessing from the network to the MEM and HDD, the data taken in to the IMAC from the network through the network control unit 178 are provided to the MEM and HDD by direct-memory-access-control DMAC. The access control unit 172 arbitrates accesses to the MEM and HDD if there are two or more jobs. The memory control unit 173 performs read-out/writing of the data to the MEM and HDD.

When accessing the MEM and HDD from the serial bus, the data taken in to the IMAC through the serial port 174 by the serial port control unit 175 are provided to the MEM and HDD by direct-memory-access-control DMAC. The access control unit 172 arbitrates accesses to MEM and HDD if there are two or more jobs. The memory control unit 173 performs read-out/writing of the data to the MEM and HDD.

Printing data from the PC connected to the network or the serial bus are expanded by the system controller 1 to a memory area of the MEM and HDD using font data on the local bus Lb.

The system controller 1 manages interfacing with external units. As for the data transfer after the data are taken in to the IMAC, each DMAC shown in FIG. 6 manages the memory access. In this case, in order that each DMAC performs data transfer independently of each other, the access control unit 172 performs priority assignment of accessing jobs to the MEM and HDD.

Here, access to the MEM and HDD is also made from the system controller 1 through the system I/F 179 for bit map expansion of stored data, in addition to accesses from each DMAC. The DMAC data or the data from system I/F 179, whichever are granted access to MEM and HDD by the access control unit 172, are directly provided to the MEM and HDD by the memory control 173.

The IMAC includes the secondary compression/decompression module 176, and the image editing module 177 for data processing inside. The secondary compression/decompression module 176 performs compression (secondary compression data) and decompression of data so that the image data or code data can be efficiently stored in the MEM and HDD. The secondary compression/decompression module 176 controls an interface with the MEM and HDD by the DMAC.

The image data once stored in the MEM and HDD are provided to the secondary compression/decompression module 176 from the MEM and HDD through the memory control unit 173 and the access control unit 172 by the direct-memory-access-control DMAC. Then, the image data converted by the secondary compression/decompression module 176 are either returned to the MEM and HDD, or output to an external bus by the direct-memory-access-control DMAC.

The image editing module 177 controls the MEM and HDD though the DMAC, and performs data processing on image data held in the MEM and HDD. Specifically, the image editing module 177 clears a memory area, and performs image processing such as rotating an image and combining images. The secondary compression/decompression module 176 reads the secondary compression data from the MEM and HDD, and decompresses them into primary compression data. Then, the image editing module 177 decompresses the primary compression data into image data by using the same decompression logic as the data expansion unit 166 of the CDIC. The image data are placed in the memory of the image editing module 177 for processing by the image editing module 177. The processed image data are primary-compressed by the same coding logic as the primary compression logic of the CDIC, and are further secondary-compressed by the secondary compression/decompression module 176, and are written to the MEM and HDD.

Figure 7:
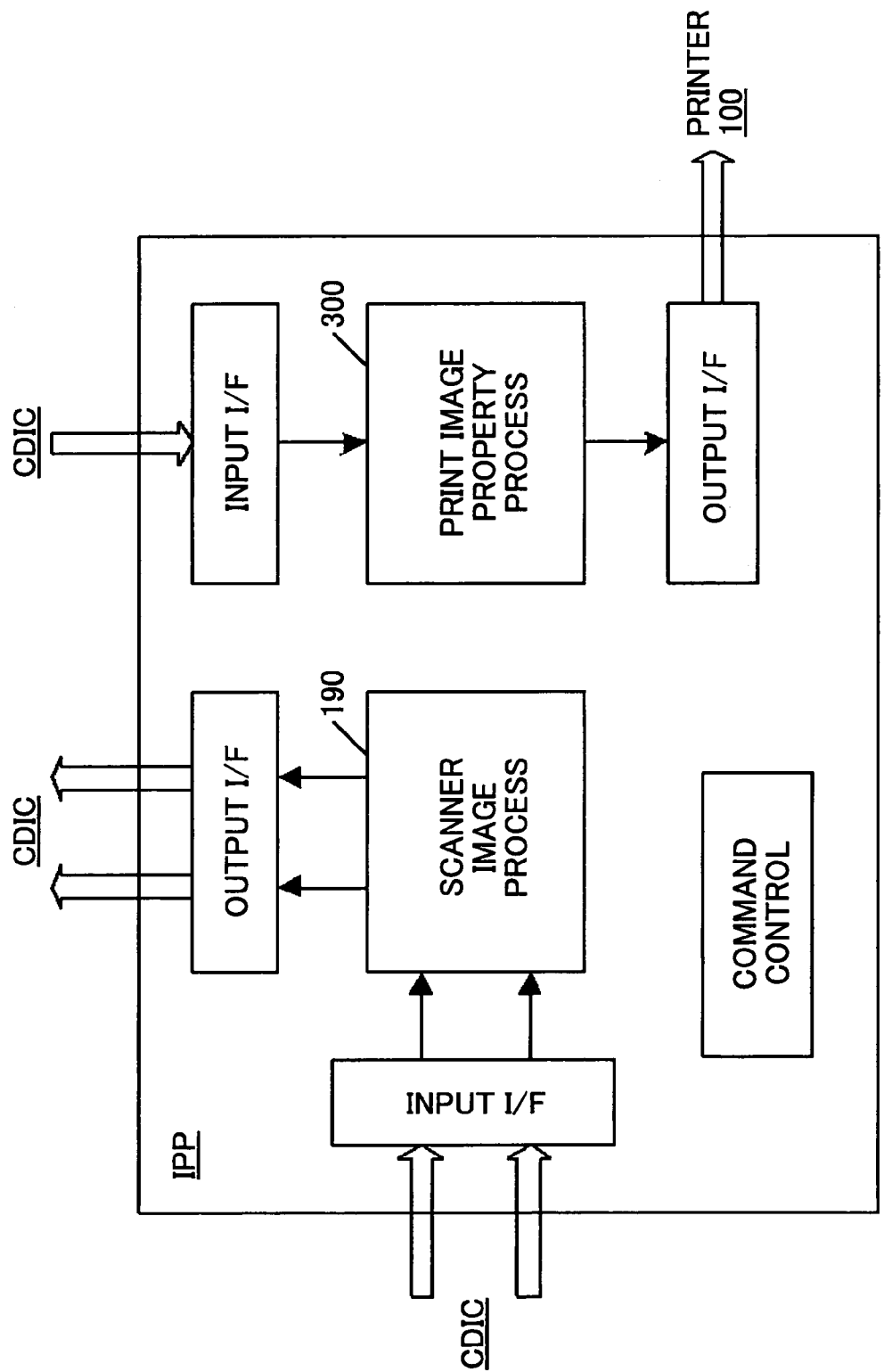
FIG. 7 is a block diagram of an image data processing unit IPP shown in FIG. 4.

FIG. 7 shows the outline of the image processing carried out by the IPP. An image that is read (read image) is provided to the IPP through an input I/F (interface) of the IPP via the SBU and the CDIC, and the scanner image process 190 is performed. The scanner image process 190 is to compensate for degradation of the signal of the read image, and performs shading compensation, scanner gamma conversion, etc. The processed data are provided to the CDIC and stored by the MEM. The image data stored in the MEM are read and provided to the IPP via the CDIC, the IPP performing the print image property process 300.

Figure 8:
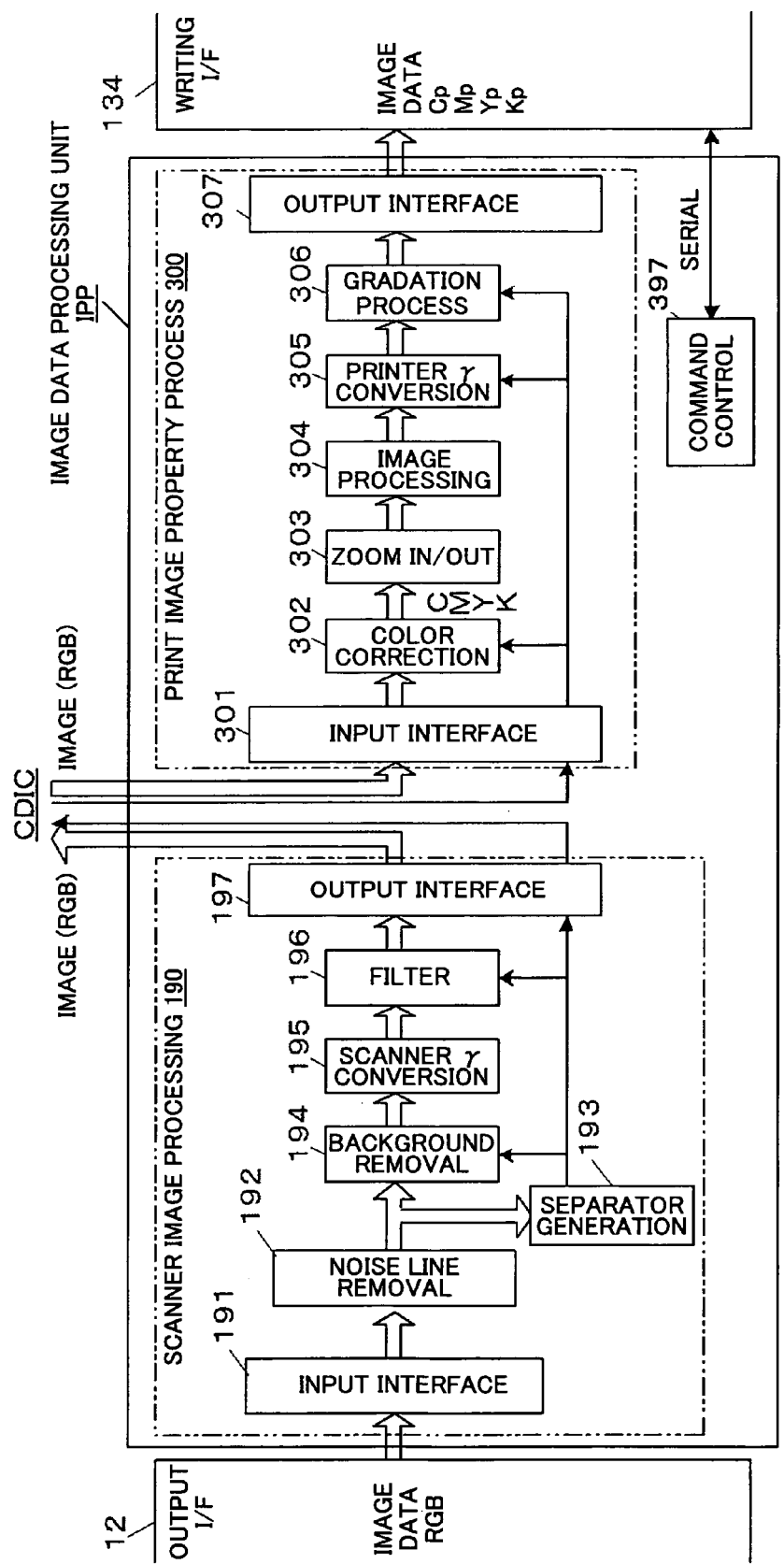
FIG. 8 is a detailed block diagram of the image data processing unit IPP shown in FIG. 4.

FIG. 8 shows the outline of the image processing functions of the IPP. The IPP performs noise line removal 192, separator generation 193 (for separating a character area from a picture area; image area separation), background color complexion removal 194, scanner gamma conversion 195, filtering 196, color correction 302, zoom in/out 303, image processing 304, printer gamma conversion 305, and gradation processing 306. The IPP is a programmable data processing unit configured to perform image processing. The image data provided to the CDIC from the output I/F 12 of the scanner 10 are provided to the IPP via the CDIC, have signal degradation through the scanner system due to the optical system and quantization of the digital signal, which degradation is compensated for by the IPP, and are then output/provided to the CDIC. The print image property process 300 is performed by the IPP on the image data returned from the CDIC to the IPP. The print image property process 300 includes color correction 302 that carries out color conversion from RGB to YMCK, zoom in/out 303, image processing 304, printer gamma conversion 305, and gradation processing 306 that includes gradation conversion, dither processing, and error diffusion processing as required.

Now, the noise line removal according to the present invention prevents an incorrect detection from occurring based on the following hypothesis, the incorrect detection being of an image (mainly a character) originally drawn on the document. That is, characters printed by a general printer have a tendency that the width of a line (stroke) constituting a character increases as the font size goes up, which is true whether the font is a bit-mapped font or a vector font. Conversely, the width of a line constituting a character decreases as the font size falls. This is because, in the case of the bit-mapped font, bit map data are expanded or shrunk in order to obtain the form of the character to be printed; and in the case of the vector font, the form of the character to be printed is obtained through a vector operation. Based on the facts described above, when a pixel at a position in the main scanning direction is determined as a noise line candidate, it is determined whether the same pixel position takes in a noise line candidate as scanning proceeds to the subsequent lines in the sub-scanning direction. A counter is provided to count the number of sub-scanning lines in which the pixel at the same pixel position continuously takes in noise line candidates. Then, the counted number is compared with a predetermined reference value L. While the counted number does not reach L, the noise line candidates are not determined as constituting a noise line. When the counted number, which is continuously incremented if noise line candidates are continuously detected, reaches L, the noise line candidates from this time and onward are determined as constituting a noise line. That is, the noise line candidates from the starting edge of the document to a point corresponding to the predetermined value L are not determined as constituting a noise line, but only noise candidates after the counted number reaches L are determined as constituting a noise line. The above described method dispenses with a large memory that would be required if all the image data are to be stored for analysis, this method achieving one of the objectives of the present invention (the second objective). In other words, a memory is required to store the counted number. Here, whether multi-value image data of a pixel constitute a noise line candidate is determined by pattern matching of the multi-value image data. Further, when multi-value image data of the pixel are not determined to constitute a noise line, the counter is reset to an initial value, typically zero.

Figure 14A:
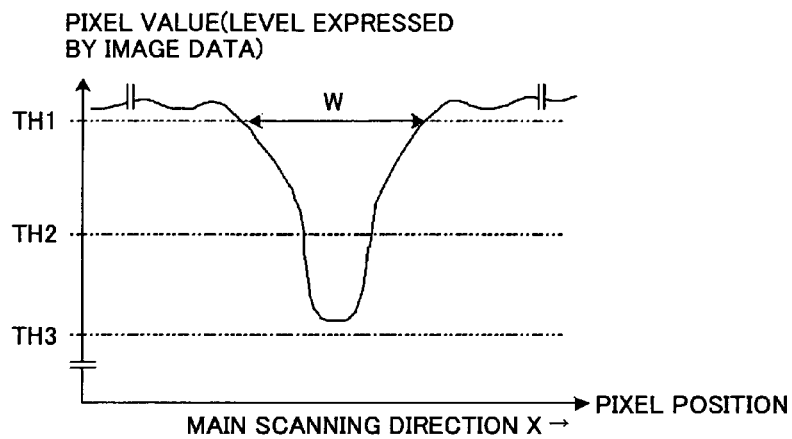
FIG. 14A is a graph that shows a distribution of image reading level that multi-value image data express, from which the noise line detection shown in FIG. 12 would detect a locally patent image pixel.

The reference value L is set at a little greater than a value, at which value a vertical line of a character is mistaken for a noise by pattern matching of multi-value image data. According to the hypothesis described above, the width of the line that constitutes a character increases as the size of the character becomes great. Therefore, a character, line breadth of which exceeds w, which is shown at FIG. 14A, is not determined to be a noise line candidate in the stage of pattern matching of multi-value image data. Accordingly, first, up to what noise line breadth is desired to detect should be determined, and the value of w is defined, then the value of L can be calculated.

Image data that are finally determined to constitute a noise line are replaced with a pixel value in an area where pixels having pixel values equal to or higher than TH1. In this manner, the noise line is made inconspicuous. According to this process, even if a real noise line is present, the tip part, i.e., from the tip of the noise line down to the point corresponding to the reference value L cannot-be removed; nevertheless, the noise line beyond the point corresponding to L is removed.

Since documents to be copied or otherwise processed are versatile, one algorithm of noise line removal may not provide optimal solutions every time. This problem is not peculiar to the present invention, but is common to other image reading apparatuses. Noise line removal is a process to remove a fault (a noise line creeping into a read image) that has already happened, wherein affinity of an algorithm with a document image is a problem to solve. Therefore, it is desirable that hardware for the noise line removal be based on a processor that can load different programs. Accordingly, in the embodiment of the present invention, the IPP is configured using programmable SIMD (Single Instruction stream Multiple Data stream) processors.

Figure 9:
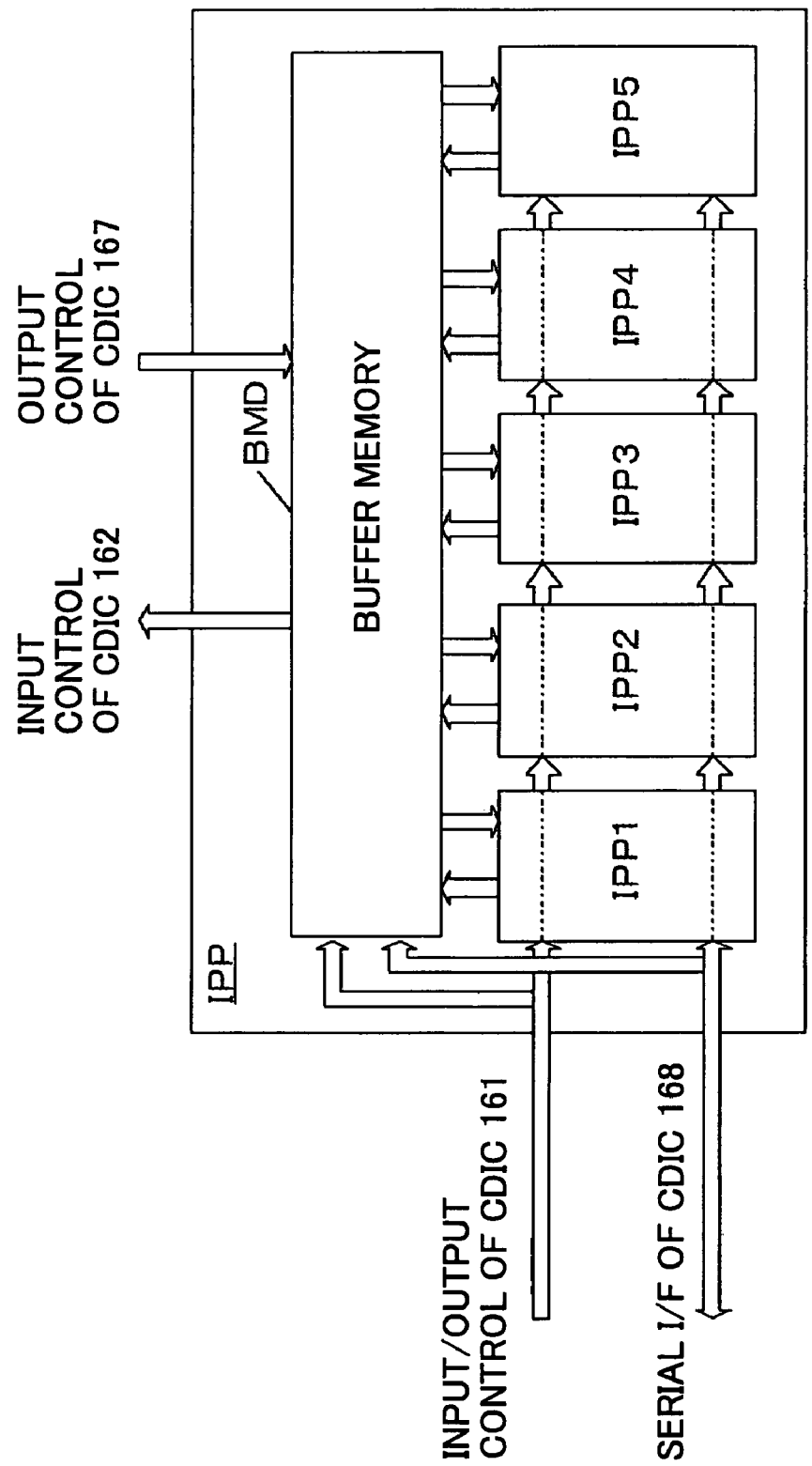
FIG. 9 is a detailed block diagram showing the outline of hardware structure of the image data processing unit IPP shown in FIG. 4.

The outline of the IPP is shown in FIG. 9. The IPP includes a buffer memory BMD capable of holding multi-value image data for one or more lines and capable of a pixel density (dpi) conversion, and programmable SIMD processors IPP1 through IPP5. The SIMD processors IPP1 through IPP5 are of the same specifications, i.e., they have the same function and are configured by the same hardware. The IPP divides image data into 5 blocks, the image data representing a line of the A4-size in the direction parallel to the short side of the imprint paper, i.e., A4 breadth, the image data being 8-bit multi-value data read by the scanner 10 at 300 dpi. Then, the IPP provides each block to one of the SIMD processors IPP1 through IPP5 such that the multi-value image data, which represent all the pixels of the line, are simultaneously processed in parallel by the IPP1 through IPP5. In other words, in order to carry out parallel simultaneous processing of all the pixels (2480 pixels, A4 breadth) of the line, the five SIMD processors IPP1 through IPP5 are provided.

Figure 10:
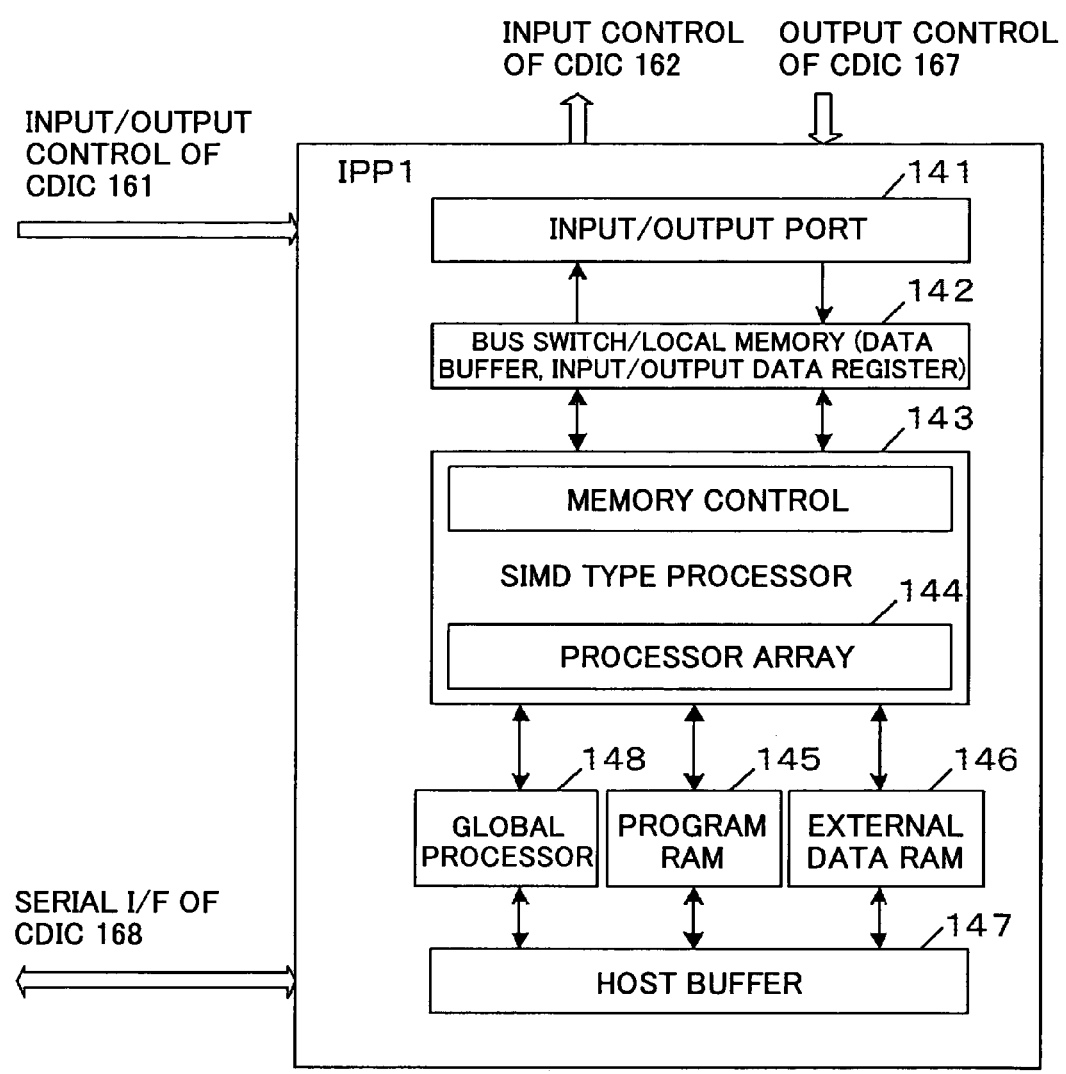
FIG. 10 is a detailed block diagram of an image data processing unit IPP1 shown in FIG. 9.

FIG. 10 outlines the internal structure of one of the SIMD processors, taking the IPP1 for example. The IPP1 receives image data from the output I/F of the scanner 10 through the CDIC and buffer memory apparatus BMD. The IPP1 inputs/outputs the image data from/to the CDIC through the BMD using an input/output port 141. The image data for input/output are temporarily stored by a data buffer or an input/output data register 142 that contains a bus switch and a buffer memory. The image data are provided to a processor array 144 through memory control 143 of an SIMD type processor, or are output to the CDIC through the buffer memory BMD. Data that control the IPP1, and an image processing program (a program and processing parameter) of the IPP1 are stored in the HDD, and are provided to a host buffer 147 and written to a data RAM 146 and a program RAM 145 by transfer control carried out by one of the system controller 1, the CDIC, and the process controller 131.

Figure 11:
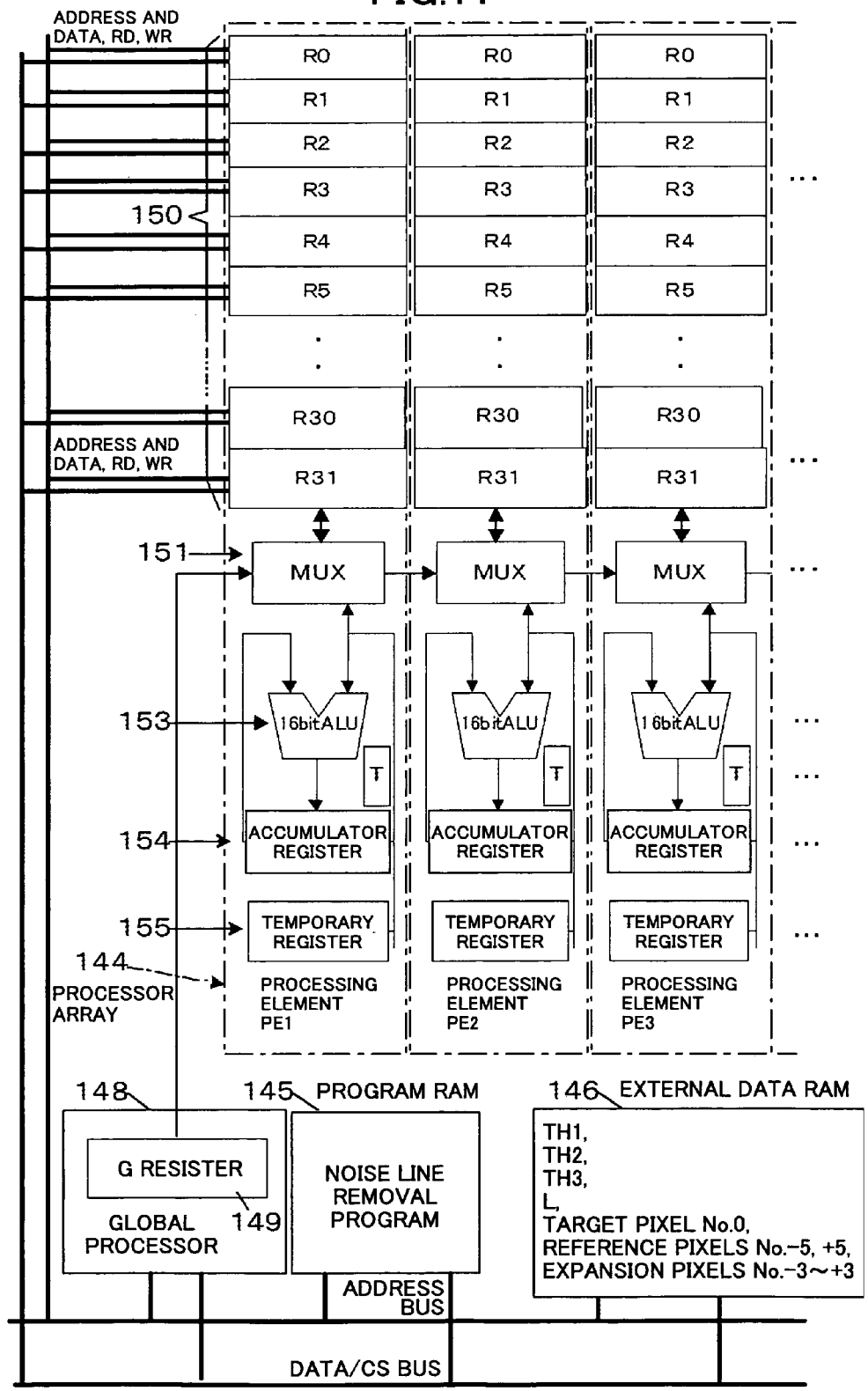
FIG. 11 is a block diagram showing a processor array 144 shown in FIG. 10.

FIG. 11 shows a part of the internal structure of the processor array 144. According to the present embodiment, the processor array 144 is a group of programmable SIMD type processing elements (PEs), wherein a single instruction is performed on two or more data items in parallel, and each processing element PE (namely, PE1, PE2, PE3, . . . ) processes respectively assigned data. Each processing element PE includes an input/output register 150, including R0 through R31, that stores data addressed to the respective PE, a multiplexer MUX 151 that accesses input/output registers 150 of other PEs, a logical operation unit ALU 153, an accumulator register (accumulator) 154 that stores a logical result, and a temporary register 155 that temporarily stores the contents of the accumulator 154.

Each input/output register 150 is connected to an address bus and a data bus (read wire and word line), and stores an instruction code that specifies a process, a data set as the object of the process, and the like. The contents of the input/output register 150 are provided to the ALU 153, and a data processing result is stored in the accumulator 154. In order to take out the result to the outside of the PE, the result is temporarily held in the temporary register 155, is written to the input/output register 150 (specifically, R8 that is assigned as an output register), and is sequentially (serially) output. The processing result of the object data is generated in a raster (serial transfer) form.

Each PE receives the same instruction code, and different data as the processing object. Each PE can refer to contents of the input/output register 150 of an adjacent PE through the MUX 151 such that an operation taking processing object data of the adjacent PE into consideration is possible. The result of the operation is output to the accumulator 154. All the PEs simultaneously perform the same operation according to the same instruction code. That is, parallel processing is carried out.

The parallel processing as described above provides the processing result quicker than sequential processing pixel by pixel. Especially, operation codes of spatial filter processing, shading compensation processing, and attribute detection processing are mathematical operations, and can be commonly and simultaneously processed by the PEs. In the present embodiment, each PE is capable of handling 512 or more pixels. Given that the number of pixels per line is 2480, the five PEs cover the need more than sufficiently. To be more precise, the number A of pixels required by the pattern recognition has to be considered. In the case shown in FIG. 14B, the number A is set at 10 (note that the center pixel, which is the target pixel, is not counted here). Accordingly, each PE being capable of handling 512 or more pixels can handle 496+A pixels, i.e., 506 pixels according to this example.

The input/output register 150 includes two or more 8-bit registers (R0 through R31 in this example) that are capable of inputting and outputting image data. The ALU 153 is capable of 16-bit operations and storing operation results in the input/output register 150, and loads the image data from the input/output register 150. The accumulator 154 and the temporary register 155 are also of a 16-bit structure. Further, each ALU includes a 1-bit T register, and according to the value of the T register, whether the ALU is to perform a program process is determined independently of other ALUs. Two or more PEs, each having the structure as described above, are provided in parallel, and execute the same program in parallel.

Figure 12:
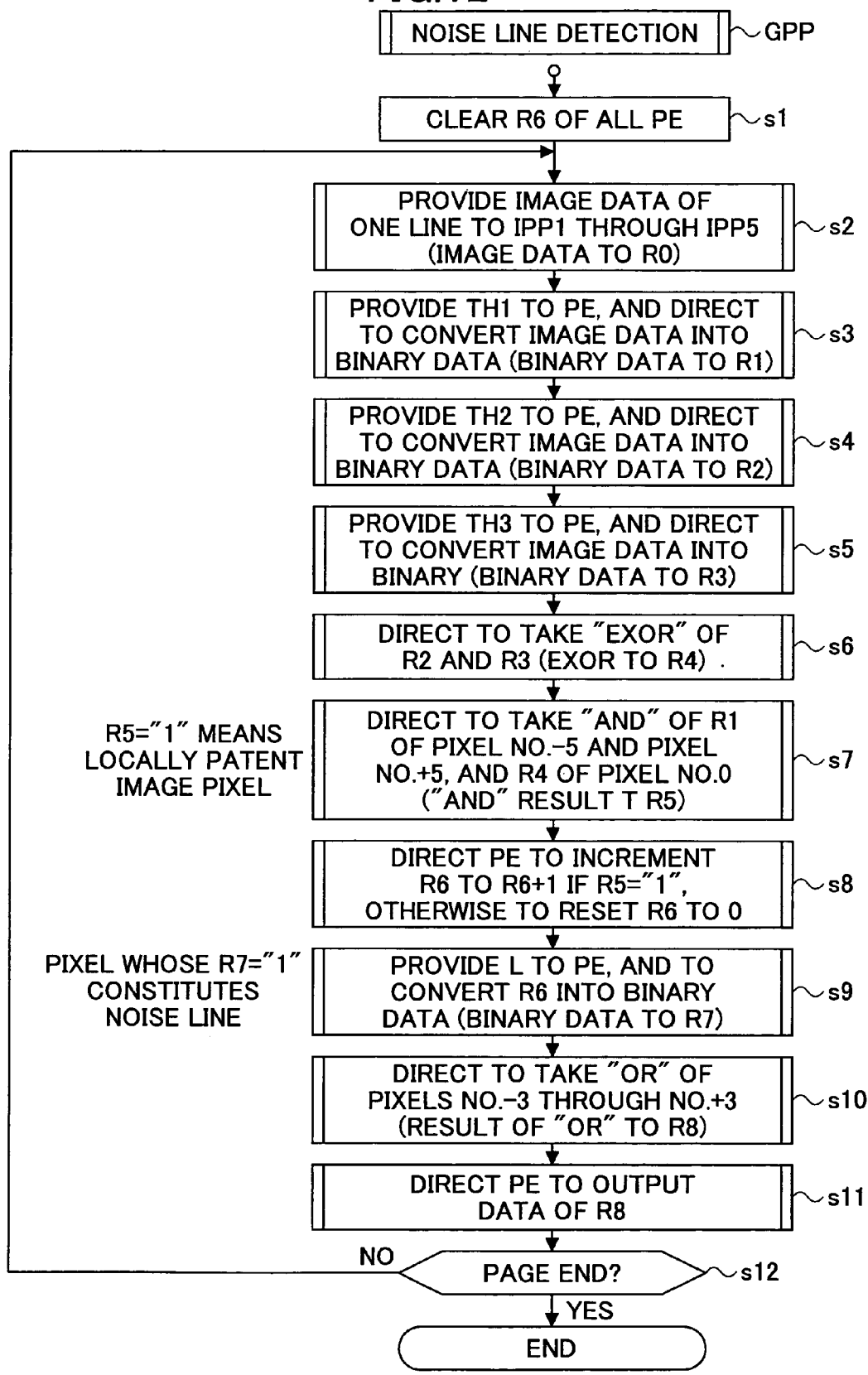
FIG. 12 is a flowchart showing the outline of data processing control of noise line detection of a global processor 148 shown in FIG. 11 according to the first embodiment.

FIG. 12 outlines a noise line detection process performed by a global processor 148 according to a noise line removal program loaded to a program RAM 145. Here, the function of the buffer memory BMD concerning the noise line removal process is described with reference to FIG. 9. Reading of a document image is started, and image data of each line are provided to the buffer memory BMD one after another for every line with advance of sub-scanning.

Figure 14B:
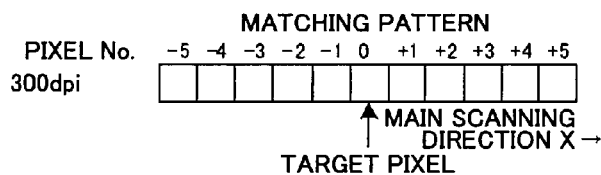
FIG. 14B is a data diagram showing a pixel area, to multi-value image data of which pattern matching for detecting a locally patent image pixel is applied, the multi-value data being read at 300 dpi.

When the document is read in a direction parallel to the shorter side of the A4 form (in the direction of breadth) at 300 dpi, the BMD stores multi-value image data that represent one line of 2048 pixels. The 2048 pixels are divided into 5 blocks, namely Blocks 1, 2, 3, 4 and 5. Here, with reference to FIG. 14E, to the IPP1, dummy image data constituted by 5 pixels containing no data of a locally patent image pixel value plus Block 1 (496 pixels) plus the first 5 pixels of Block 2, the total being 506, are provided.

To the IPP2, the last 5 pixels of Block 1 plus Block 2 (496 pixels) plus the first 5 pixels of Block 3 are provided.

To the IPP3, the last 5 pixels of Block 2 plus Block 3 (496 pixels) plus the first 5 pixels of Block 4 are provided.

To the IPP4, the last 5 pixels of Block 3 plus Block 4 (496 pixels) plus the first 5 pixels of Block 5 are provided.

To the IPP5, the last 5 pixels of Block 4 plus Block 5 (496 pixels) plus the dummy image data (5 pixels) are provided.

In this way, data for a total of 506 pixels are provided to each IPP.

Figure 13:
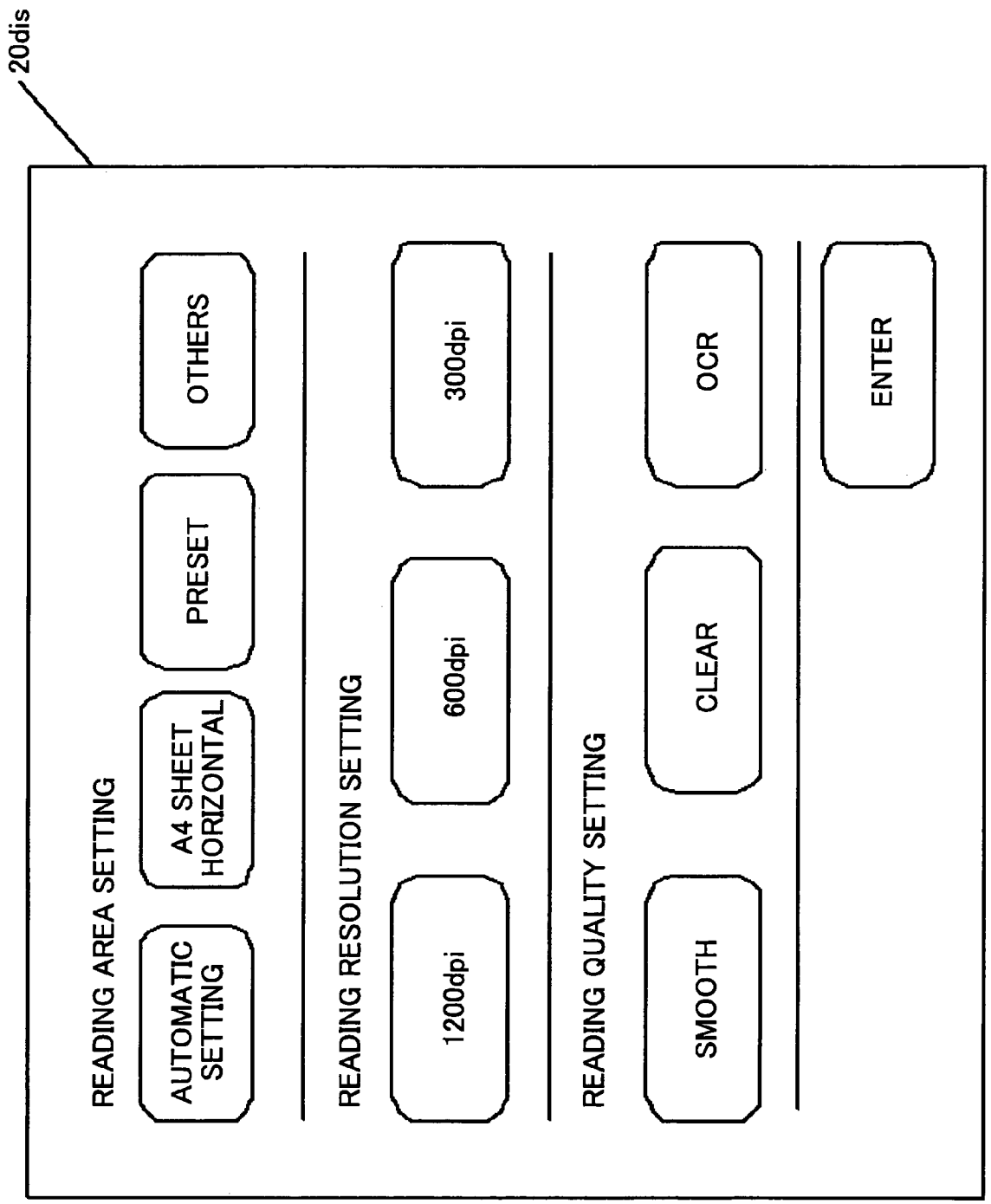
FIG. 13 shows a document reading condition input screen that is displayed on a liquid-crystal-display (LCD) panel 20*dis* of the operating board 20 shown in FIG. 1 and FIG. 4.

In addition, when an image is to be scanned, reading conditions can be provided from the operating board 20 through an input screen displayed on a liquid crystal touch-panel 20dis as shown in FIG. 13. Using the operating board 20, reading resolutions (dpi), for example, can be specified. The default of the reading resolution is 300 dpi. When a resolution of 600 dpi or 1200 dpi is selected, read data at the selected resolution are stored in the memory, while the BMD carries out pixel density conversion from the selected resolution (i.e., 600 dpi or 1200 dpi) to 300 dpi. The resolution converted data, i.e., at 300 dpi, are distributed to the IPP1 through IPP5. Note that the image data at the selected resolution stored in the memory are not tampered with (stored data are not resolution-converted).

Each of the IPP1 through IPP5 determines whether a pixel under inspection (target pixel) is a locally patent image pixel with reference to five adjacent pixels on each side (on the left side and on the right side of the target pixel). That is, with reference to FIG. 14B, the target pixel 0 is inspected with reference to adjacent pixels in a narrow region, specifically the pixel No. −5 through the pixel No. +5 in the main scanning direction. Whether the arrangement of values of the 11 pixels, including the target pixel, matches a noise-line-crossing pattern is determined. If the determination is affirmative, i.e., the arrangement matches the noise-line-crossing pattern, i.e., the target pixel is a locally patent image pixel, a signal "1" is generated and held in R5 of the target pixel. Otherwise, a signal "0" is generated and held in R5. When the signal "1" is generated, R6 is incremented. When the signal "0" is generated, R6 is initialized, typically reset to zero. When the value of R6 reaches the reference value L, the pixels having locally patent image values are determined to constitute a noise line, and R8 is made to "1", serving as a noise line detection signal. Then, the "1" is output to the BMD.

Figure 14C:
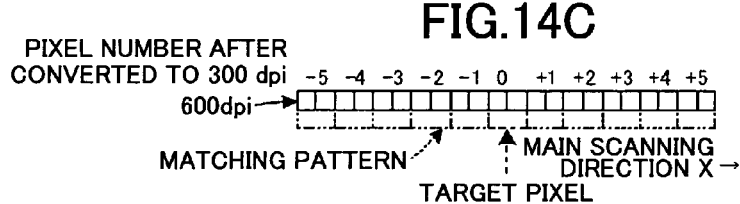
FIG. 14C is a data diagram showing a pixel area, to multi-value image data of which pattern matching for detecting a locally patent image pixel is applied, the multi-value data being read at 600 dpi.
Figure 14D:
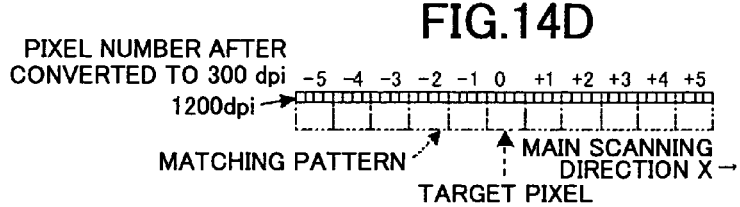
FIG. 14D is a data diagram showing a pixel area, to multi-value image data of which pattern matching for detecting a locally patent image pixel is applied, the multi-value data being read at 1200 dpi.
Figure 14E:
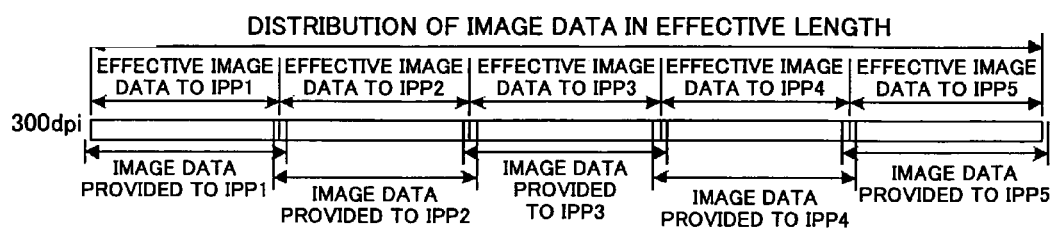
FIG. 14E is a data diagram showing block partitions of multi-value image data of a line, the multi-value image data being distributed to the IPP1 through the IPP5 from a buffer memory apparatus BMD shown in FIG. 9.

As shown in FIG. 14C, when reading at 600 dpi, a pixel of a noise line crossing pattern corresponds to contiguous 2 pixels of the read multi-value image data. As shown in FIG. 14D, when reading at 1200 dpi, a pixel of a noise line crossing pattern corresponds to contiguous 4 pixels of the read multi-value image data.

When the noise line detection signal "1" is received from the IPP1 through IPP5, the BMD replaces the multi-value image data of the pixels that constitute the noise line with a pixel value of a preceding pixel on the same line in the main scanning direction, when the data are read at 300 dpi. Since there is no preceding pixel in the case of the first pixel of the line, the dummy image data replace the multi-value image data of the first pixel when the first pixel constitutes the noise line. As for multi-value image data having a "0" concerning the noise line detection, the data are kept as they are with no change in the memory. When a higher resolution is selected, e.g., 600 dpi, the noise line detection data for a line, which IPP1 through IPP5 output, are converted into 600 dpi from 300 dpi, and then the multi-value image data of the line stored in the memory are replaced as described above in the case of 300 dpi. When 1200 dpi is selected, the noise line detection data for a line, which IPP1 through IPP5 output, are converted into 1200 dpi from 300 dpi, and then the multi-value image data of the line stored in the memory are replaced as described above in the case of 300 dpi.

Here, with reference to FIG. 12, the noise line detection process of the global processor 148 is explained. First of all, at step s1, the processor 148 clears the register R6 that counts the number of continuous lines in the sub-scanning direction, the continuous lines having locally patent image pixels at the same position in the main scanning direction. In the following, the word "step" may be omitted, showing, e.g., only s1, s2, and so on.

Next, at s2, the processor 148 writes multi-value image data of each pixel of Block 1 provided by the BMD to the register R0, which serves as an input register, of each PE.

In the present embodiment, black is expressed by 0 in multi-value image data (all the color components having the highest level), the value of the multi-value image data increases as the brightness increases, and white (all the color components having the lowest level) is expressed by 255, which is the greatest number in the 8-bit system. In FIG. 14A, distribution of the values of multi-value image data in the direction x, i.e., in the main scanning direction is shown, where a pixel having a high level of the color components (having a low pixel value) is present among pixels that have low levels of the color components (having high pixel values). The IPP1 through IPP5 determine a pixel (valley) that has a pixel value between TH2 and TH3 as a locally patent image pixel by data processing explained below. In addition, the present invention can be practiced by defining black (all the color components at the highest level) as having the highest value 255, and white (all the color components at the lowest level) as having the lowest value 0, with the value of multi-value image data decreasing as the color becomes brighter; in which case, the curve shown in FIG. 14A can be applied by vertically reversing the graph, whereby the peak (not the valley) represents the locally patent image pixel.

With reference to FIG. 12 again, at s3, the processor 148, having provided multi-value image data to all the PEs, provides all the PEs with a first threshold value TH1 for determining whether a pixel has no image, i.e., the same as the background, and directs the conversion of the multi-value image data of the register R0, serving as an input register, into binary data. Each PE, in response to the direction, generates and writes "1" to the register R1 if the value of the multi-value image data is greater than TH1. Otherwise, "0" is generated and written. Then, the processor 148 provides a second threshold value TH2 to all the PEs such that each PE determines whether a pixel has an image element, and directs the conversion of the multi-value image data of the input register R0 to binary data (s4). Each PE, in response to the direction, generates and writes "1" to the register R2 if the value of the multi-value image data is greater than TH2. Otherwise, "0" is generated and written. Next, the processor 148 provides all the PEs with a third threshold value TH3 for determining whether a pixel has a high level (dark), and directs the conversion of the value of the multi-value image data of the input register R0 to binary data (s5). Each PE, in response to the direction, generates and writes "1" in the register R3 if the value of the multi-value image data is greater than TH3. Otherwise, "0" is generated and written.

Next, the processor 148 directs all the PEs to take an EXOR (exclusive OR) of the binary data of the registers R2 and R3 (s6). In response, each PE computes EXOR of the binary data of the registers R2 and R3, and writes the result in the register R4. The pixel, binary data written to the register R4 which equals "1", is a candidate of a locally patent image pixel that has a value of the multi-value image data less than TH2 and greater than TH3.

Next, the processor 148 directs all the PEs to carry out pattern matching. A PE is taken, for example, and called $PE_0$. The $PE_0$ handles the target pixel, and is to carry out pattern matching of the target pixel by taking an AND between the binary data of the register R1 of $PE_{i-5}$ and $PE_{i+5}$ (that would be "1" if the corresponding pixel is near to having no image element), and the binary data of the register R4 (that would be "1" if the corresponding pixel is a locally patent image pixel candidate) of $PE_0$ (s7).

Each PE performs as above, and results are written to the register R5 in the binary form ("1" if determined as being a locally patent image pixel).

If the value of the binary data of the register R5 is "1" (i.e., locally patent image pixel), the processor 148 increments the value of the register R6 (initial value being 0 by s1) by 1. Otherwise, if the value of the binary data of the register R5 is "0", the register R6 is cleared (s8). Then, the processor 148 provides the reference value L to all the PEs, and directs the conversion of the data of the register R6 into binary data (s9). All the PEs perform the conversion, and write the binary data (the value of which is "1", if the value is greater than the reference value L, i.e., a pixel constituting a noise line) in the register R7. The binary data are the noise line pixel detection data (being "1", if the pixel constitutes the noise line) that indicate whether the multi-value image data provided to each PE constitute the noise line.

Here, a ratio "a" is considered, which is equal to the height H of a character divided by the breadth w of a line (stroke) of the character, i.e., a=H/w. The ratio "a" of the kanji character "朝" in MS Mincho font is as great as 17.9 (about 18), and the ratio "a" of the same kanji character in bold letter, Gothic, which looks like "朝", is about 13.3. The ratio "a" of the Roman character "D" in Gothic is as small as about 8.4. According to the present embodiment, it is assumed that a document is read at 300 dpi, which is equal to 11.81 dpmm. Further, it is assumed that a noise line having a line breadth up to a width W is to be detected. The width W is defined as the width of 9 inner pixels of the narrow region, i.e., 11 pixels, the 11 pixels being the pixel No. −5 through the pixel No. +5, and the 9 inner pixels being the pixel No. −4 through the pixel No. +4 (refer to FIG. 14B). Accordingly, the width W is equal to 9/11.81=0.76 mm in the main scanning direction. Then, a product of W=0.76 mm and 18 is obtained to be 13.68 mm, where 18 is an approximation of the greatest value of the ratio "a" of characters. This amount, 13.68 mm, is used to determine the number of lines as to whether the lines continuously contain locally patent image pixels at the same main scanning position. Namely, in the case of 300 dpi, the reference value L is the number of lines read at 300 dpi in an interval (height) equal to 13.68 mm in the sub-scanning direction. In the case of 600 dpi, the reference value L is the number of lines read at 600 dpi in the interval (height) equal to 13.68 mm. Similarly, in the case of 1200 dpi, the reference value L is the number of lines read at 1200 dpi in the interval (height) equal to 13.68 mm.

Next, the processor 148 directs all the PEs that are provided with image data of the pixel No. −3 through the pixel No. +3 pixel to take an OR between registers R7 of the PEs (s10). All the PEs perform the OR operation and write obtained binary data ("1" if the pixel is in the noise line width) in the respective registers R8. In this manner, if 3 inner pixels, i.e., the pixel No. −1 through the pixel No. +1 shown in FIG. 14B are determined to constitute a noise line, "1" is written to each register R8 of the PEs, to which the multi-value image data of the pixels of No. −3 through No. +3 are provided, "1" meaning that the pixel is within the noise line width, and the noise line width is extended in the direction x of main scanning.

Next, the processor 148 outputs the noise line detection data of each register R8 of all the PEs to the BMD (s11). The processor 148 in collaboration with the BMD repeats the above-mentioned process line by line until the end of the 1-page document in the sub-scanning direction.

According to the noise line detection GPP (FIG. 12) of the first embodiment explained above, the register R6 is initialized to 0 when a locally patent image pixel is not detected at the same position in the main scanning direction, as lines are inspected in the sub-scanning direction (s8). Accordingly, if a noise line is continuously present from the starting edge to the ending edge of sub-scanning, the noise line can be removed from the point corresponding to the reference value L to the ending edge, leaving, however, the noise line from the starting edge to the point corresponding to the reference value L. In the case that interrupted noise lines appear, the noise line from the starting point of the noise line for a distance corresponding to the reference value L remains, while the remaining portion beyond the point corresponding to the reference value L is removed. However, according to this embodiment, a relatively short straight line parallel to the sub-scanning direction, a character greater than assumed, and a line drawing may be mistaken for a noise line, and removed. For this reason, the first embodiment is suitable for reading a document with only standard characters.

The scanner gamma conversion 195 and the printer gamma conversion 305 use different conversion characteristic convention data sets. The conversion characteristic convention data sets, and a data conversion control program using the conversion characteristic convention data sets for controlling the data for image processing are stored in the HDD.

When reading a document image by the scanner 10, the control program and reference data for the scanner image process 190 including the scanner gamma conversion are read from the HDD, and are written in the program RAM 146 and the external data RAM 145 of the IPP. The global processor 148 performs the scanner image process 190 (FIG. 8) based on the data stored in the program RAM 146 and the external data RAM 145.

When printing out an image by the printer 100, the control program and reference data for the printer print image property process 300 (FIG. 8) including the printer gamma conversion 305 are read from the HDD, and are written to the program RAM 146 and the external data RAM 145 of the IPP. The global processor 148 performs printer print image property process 300 based on the data stored in the program RAM 146 and the external data RAM 145.

Second Embodiment

Although the hardware of the second embodiment is the same as the first embodiment described above, the second embodiment differs from the first embodiment as for the noise line removal program stored in the program RAM 145.

Figure 15:
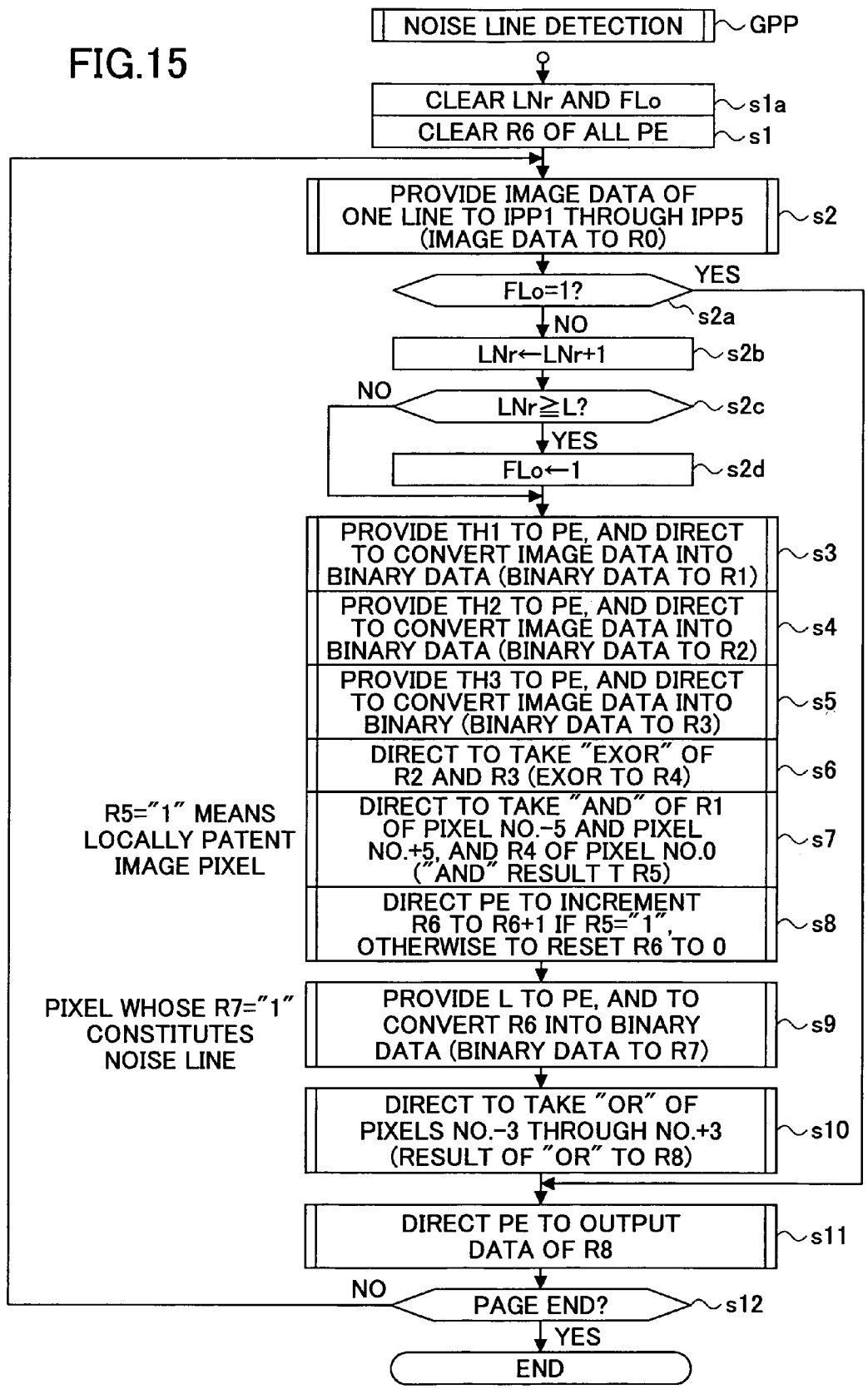
FIG. 15 is a flowchart showing the outline of data processing control of noise line detection of the global processor 148 according to the second embodiment of the present invention.
Figure 16:
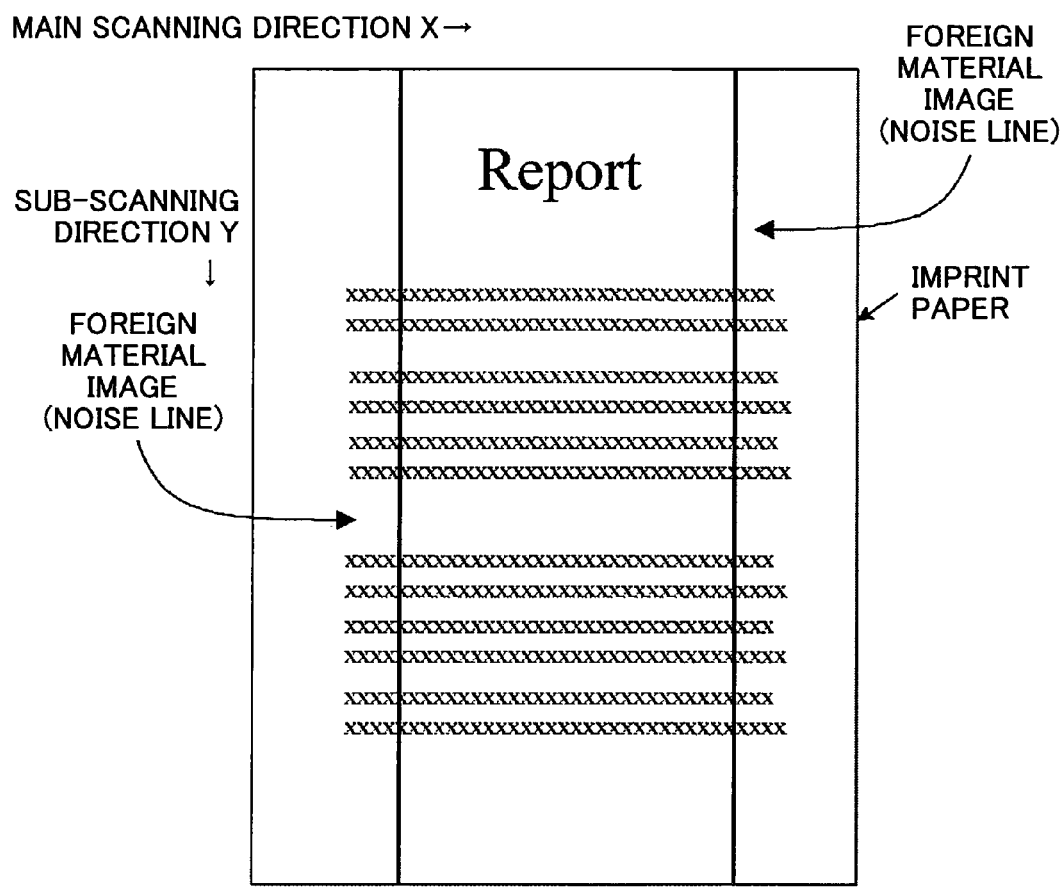
FIG. 16 shows an example of a printed form wherein noise lines, with some exaggeration, are produced when a noise line removal process is not carried out.

FIG. 15 outlines the noise line detection GPP that the processor 148 performs according to the second embodiment of the noise line removal program stored in the program RAM 145. First of all, at step s1a, the processor 148 clears (initializes) a register LNr that counts the amount of sub-scanning, and a flag register FLo that holds information as to whether the sub-scanning amount reaches the reference value L. Then, at s1, the processor 148 clears the register R6 of all the PEs of the IPP1, the register R6 counting the number of continuous lines in the sub-scanning direction, which lines have locally patent image pixels at the same position in the main scanning direction.

Next, the processor 148 writes multi-value image data, which are provided by the BMD, of each pixel of Block 1 in the input register R0 of each PE (s2). Afterwards, the noise line detection (s3 through s10) is performed as the first embodiment. However, in the second embodiment, the noise line detection (s3 through s10) is performed only until the amount of sub-scanning from the starting edge of a document reaches the reference value L. The noise line detection (s3 through s10) is not performed beyond the point where the amount of sub-scanning exceeds the reference value L, but the noise line detection result (data of R8) as at the reference value L is repeatedly output.

That is, whenever image data of one line (one block addressed to the IPP1) are written in each register R0 of each PE until the amount of sub-scanning reaches the reference value L, the register LNr is incremented by 1 (s2a and s2b), and it is determined whether the data of the register LNr are equal to or greater than the amount of sub-scanning equivalent to the reference value L (the number of lines) (s2c). Then, if the amount reaches the amount of sub-scanning equivalent to the reference value L, "1" showing this fact is written to the flag register FLo (s2d). At the noise line detection (s3 through s10) following the writing step s2d, "1" is written in the register R7 of the PE that detects a noise line that continues from the starting edge of the document to the point corresponding to the amount of sub-scanning equivalent to the reference value L. Subsequently, "1" is written in the register R8 of three PEs before and after the noise line pixel, i.e., the pixel No. −3 through the pixel No. +3, "1" meaning that the pixel is in the noise line (in the noise line width), serving as noise line information. The noise line information is output to the BMD (s11). Afterwards, the noise line information is repeatedly output to the BMD without performing the noise line detection (s3 through s10) until sub-scanning reaches the end of the document (s2a through s11).

As described above, according to the second embodiment, when a noise line appears from the starting edge of sub-scanning a document for a distance corresponding to the reference value L, even if the noise line may be interrupted afterwards, the noise line is completely removed after the point corresponding to the reference value L down to the ending edge of sub-scanning. In the case that a noise line is interrupted in the interval between the starting edge and the point corresponding to the reference value L, since noise line detection is not performed after the reference value L, the noise line is not removed. As described, when a noise line appears from the sub-scanning starting edge until sub-scanning progresses to some extent, the noise line is completely removed after that extent down to the end of sub-scanning. According to the second embodiment of the present invention, a relatively short straight line parallel to the sub-scanning direction, a character greater than assumed, and a line drawing cannot be mistaken for a noise line unless they start from the sub-scanning starting edge of the document.

Further, the present invention is not limited to these embodiments, but variations and modifications may be made without departing from the scope of the present invention.

The present application is based on Japanese Priority Application No. 2004-016574 filed on Jan. 26, 2004 with the Japanese Patent Office, the entire contents of which are hereby incorporated by reference.

What is claimed is:

1. A document reading apparatus, comprising:
a document scanner including
an image pickup device including a photo-electric conversion element array constituted by a plurality of photo-electric conversion elements arranged in a line in a main scanning direction, said image pickup device configured to repeatedly output an image reading signal provided by said photo-electric conversion element array for every main scanning line,
a conversion unit configured to convert the image reading signal into multi-value image data of a pixel on the main scanning line, said multi-value image data being digital data that corresponds to the image reading signal,
an optical system configured to project an image of a document to the image pickup device, and
a sub-scanning unit configured to drive one of the optical system or the document in a sub-scanning direction; and
an image data processing unit including
a determination unit configured to identify a locally patent image pixel based on the multi-value image data by comparing a group of pixels formed by a target pixel and a plurality of pixels adjacent to the target pixel in the main scanning direction with a noise-line crossing pattern, and identifying said target pixel as a locally patent image pixel when said group matches the noise-line crossing pattern,
a counter configured to count the number of lines on which the locally patent image pixels are continuously detected at the same pixel position as preceding lines and output a counter value, the counter beginning to count at a starting edge of sub-scanning during document reading, and
a replacement unit configured to compare the counter value with a reference value based on a ratio of character height to character line width and to replace the multi-value image data of any locally patent image pixels detected by the determination unit and a predetermined range of pixels in the main scanning direction relative thereto, after the counter reaches the reference value, with multi-value image data having a value that levels the locally patent image pixels.

2. The document reading apparatus as claimed in claim 1, wherein said reference value is the number of lines in the sub-scanning direction contained in a width equivalent to a product of a value 18 or greater and a width between pixels having a flat level on both ends of a width section in which the locally patent image pixel is searched for.

3. The image reading apparatus as claimed in claim 1, wherein said image data processing unit initializes the lines where no locally patent image pixel is detected as the sub-scanning proceeds.

4. The document reading apparatus as claimed in claim 1, further comprising:

a data memory unit configured to store property convention data that specifies properties of a data process to detect the locally patent image pixels, and define the reference value;
a plurality of processing elements, each processing an assigned set of multi-value image data according to the property convention data stored in the data memory; and
a process control unit configured to control data processing performed by the processing elements and to provide an operating direction to the processing elements based on the process control data,
said process control unit further configured to control distribution of a series of data sets to be processed by the processing elements, sending out of the property convention data stored in the data memory, and outputting the processed data from the processing elements.

5. An image formation apparatus comprising:
a document scanner including
an image pickup device including a photo-electric conversion element array constituted by a plurality of photo-electric conversion elements arranged in a line in a main scanning direction, said image pickup device configured to repeatedly output an image reading signal provided by said photo-electric conversion element array for every main scanning line,
a conversion unit configured to convert the image reading signal into multi-value image data of a pixel on the main scanning line, said multi-value image data being digital data that corresponds to the image reading signal,
an optical system configured to project an image of a document to the image pickup device, and
a sub-scanning unit configured to drive one of the optical system or the document in a sub-scanning direction;
an image data processing unit including
a determination unit configured to identify a locally patent image pixel based on the multi-value image data by comparing a group of pixels formed by a target pixel and a plurality of pixels adjacent to the target pixel in the main scanning direction with a noise-line crossing pattern, and identifying said target pixel as a locally patent image pixel when said group matches the noise-line crossing pattern,
a counter configured to count the number of lines on which the locally patent image pixels are continuously detected at the same pixel position as preceding lines and output a counter value, the counter beginning to count at a starting edge of sub-scanning during document reading, and
a replacement unit configured to compare the counter value with a reference value based on a ratio of character height to character line width and to replace the multi-value image data of any locally patent image pixels detected by the determination unit and a predetermined range of pixels in a main scanning direction relative thereto, after the counter reaches the reference value, with multi-value image data having a value that levels the locally patent image pixels; and
a printer configured to form an image on a form,
wherein said image data processing unit performs gamma conversion that converts the image data for record output suitable for image formation by the printer.

6. A method for replacing multi-value image data of locally patent image pixels in a document reading apparatus, said method comprising:
scanning a document including driving one of an optical system or a document in a sub-scanning direction, projecting an image of the document to an image pickup device, outputting an image reading signal for every main scanning line, converting the image reading signal into multi-value image data of a pixel on the main scanning line; and processing the image including identifying a locally patent image pixel based on the multi-value image data by comparing a group of pixels formed by a target pixel and a plurality of pixels adjacent to the target pixel in a main scanning direction with a noise-line crossing pattern, and identifying said target pixel as a locally patent image pixel when said group matches the noise-line crossing pattern, counting the number of lines on which the locally patent image pixels are continuously detected at the same pixel position as preceding lines, the counting beginning at a starting edge of sub-scanning during document reading, outputting a counter value, comparing the counter value with a reference value based on a ratio of character height to character line width, and replacing the multi-value image data of any locally patent image pixels detected by the identifying and a predetermined range of pixels in the main scanning direction, after the counter reaches the reference value, with multi-value image data having a value that levels the locally patent image pixels.

* * * * *